(12) United States Patent
Yadhav et al.

(10) Patent No.: US 12,445,916 B2
(45) Date of Patent: Oct. 14, 2025

(54) DYNAMIC DISTRIBUTED LOCAL BREAKOUT DETERMINATION

(71) Applicant: Telefonaktiebolaget LM Ericsson (publ), Stockholm (SE)

(72) Inventors: Vinay Yadhav, Upplands Väsby (SE); Mina Sedaghat, Solna (SE); Daniel Turull, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 17/759,608

(22) PCT Filed: Feb. 24, 2020

(86) PCT No.: PCT/SE2020/050207
§ 371 (c)(1),
(2) Date: Jul. 27, 2022

(87) PCT Pub. No.: WO2021/173046
PCT Pub. Date: Sep. 2, 2021

(65) Prior Publication Data
US 2023/0123162 A1    Apr. 20, 2023

(51) Int. Cl.
*H04W 36/00* (2009.01)
*H04L 67/51* (2022.01)
*H04L 67/60* (2022.01)

(52) U.S. Cl.
CPC ......... *H04W 36/0077* (2013.01); *H04L 67/51* (2022.05); *H04L 67/60* (2022.05); *H04W 36/00695* (2023.05); *H04W 36/0094* (2013.01)

(58) Field of Classification Search
CPC ....... H04W 36/0077; H04W 36/00695; H04W 36/0094; H04W 36/00; H04L 67/51; H04L 67/60; G06F 9/4856; G06F 9/48
See application file for complete search history.

(56) References Cited

U.S. PATENT DOCUMENTS 11,159,344 B1 * 10/2021 Shevade ............... G06F 9/5077
2018/0199398 A1    7/2018 Dao et al.
(Continued)

OTHER PUBLICATIONS

Costa-Requena et al., "SDN-Based UPF for Mobile Backhaul Network Slicing", 2018 European Conference On Networks And Communications (Eucnc), IEEE, 2018, pp. 48-53.
(Continued)

*Primary Examiner* — Tonia L Dollinger
*Assistant Examiner* — Mehulkumar J Shah
(74) *Attorney, Agent, or Firm* — Nicholson, De Vos, Webster & Elliott, LLP

(57) ABSTRACT

A method by a user plane breakout function in a mobile core network for providing dynamic distributed local breakout. The method includes receiving, from one or more neighboring user plane breakout functions, service instance information of one or more instances of a service, processing capacity information of one or more edge clouds, and link quality information of one or more links between other user plane breakout functions. The method further includes, calculating, for each of the one or more instances of the service, a service instance access score for that instance of the service based on the service instance information, the processing capacity information, and the link quality information.

20 Claims, 14 Drawing Sheets

(56) References Cited

U.S. PATENT DOCUMENTS

| | | | |
|---|---|---|---|
| 2019/0215730 A1* | 7/2019 | Qiao | H04L 43/087 |
| 2020/0008044 A1* | 1/2020 | Poornachandran | H04L 41/5019 |
| 2020/0154459 A1* | 5/2020 | Mukherjee | H04W 72/535 |
| 2021/0099848 A1* | 4/2021 | Ruan | H04W 84/042 |
| 2021/0112447 A1* | 4/2021 | Ogura | H04W 28/06 |
| 2021/0168027 A1* | 6/2021 | Parulkar | H04W 28/0226 |

OTHER PUBLICATIONS

International Search Report and Written Opinion, PCT App. No. PCT/SE2020/050207, Nov. 4, 2020, 11 pages.

Kekki et al., "MEC in 5G networks", ETSI White Paper No. 28, First edition, Jun. 2018, pp. 1-28.

Li et al., "Elastic Local Breakout Strategy and Implementation for Delay-Sensitive Packets with Local Significance", 2017 9th International Conference on Wireless Communications and Signal Processing (WCSP), 2017, 6 pages.

Ojanpera et al., "Application Synchronization Among Multiple MEC Servers in Connected Vehicle Scenarios", 2018 IEEE 88Th Vehicular Technology Conference (Vtc-Fall), IEEE, 2018, pp. 1-5.

* cited by examiner

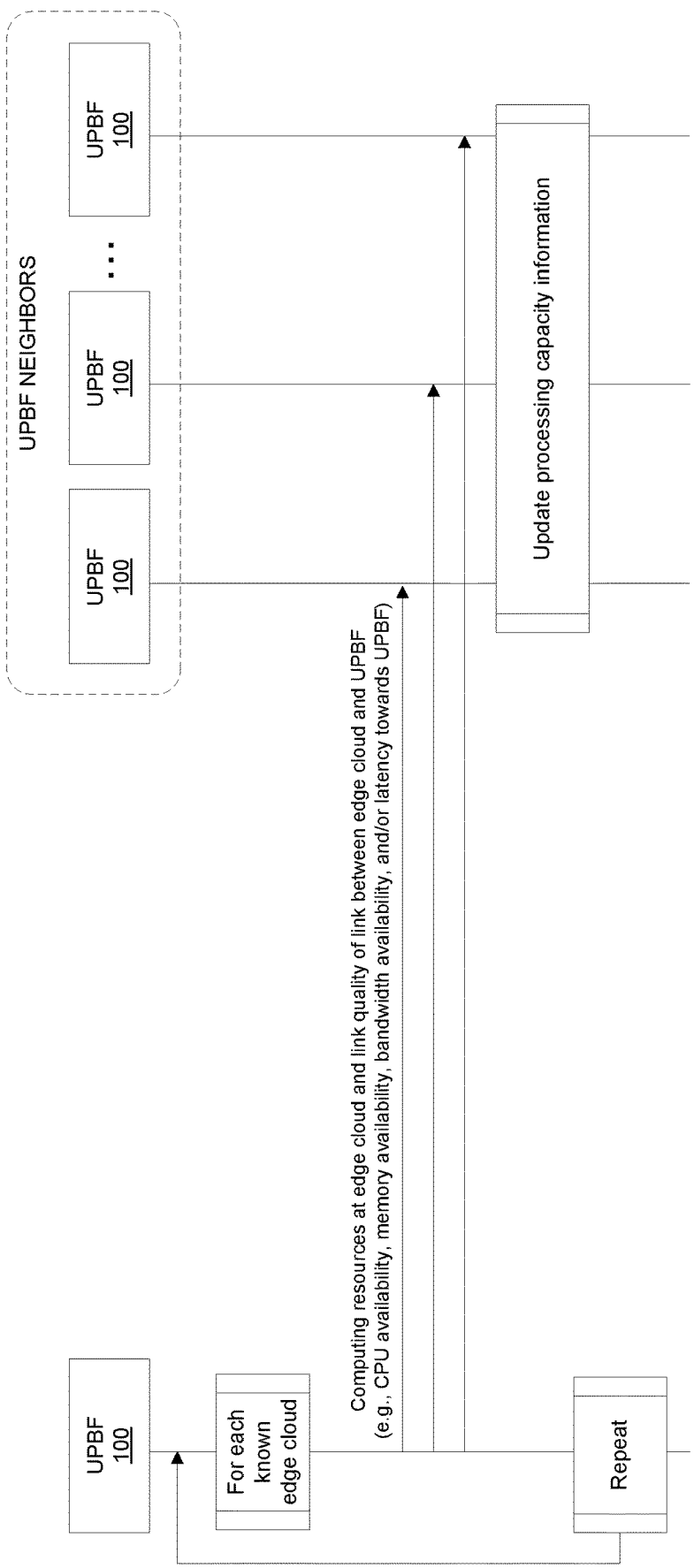

DYNAMIC DISTRIBUTED LOCAL BREAKOUT DETERMINATION

CROSS-REFERENCE TO RELATED APPLICATIONS

This application is a National stage of International Application No. PCT/SE2020/050207, filed Feb. 24, 2020, which is hereby incorporated by reference.

TECHNICAL FIELD

Embodiments relate to the field of telecommunications networks, and more specifically to providing dynamic distributed local breakout in a mobile core network.

BACKGROUND

Multi-access edge computing (MEC), also known as mobile edge computing, is a network architecture concept that provides cloud computing capabilities at or near the edge of the network, closer to users. MEC typically involves deploying multiple distributed edge clouds at or near the edge of the network which can host one or more services. This allows services to be provided to users with lower latency and higher reliability. Multiple instances of a given service can be hosted across multiple distributed edge clouds. A user can be served by any one of the service instances depending on a set of criteria such as latency, bandwidth, and/or other service constraints/requirements. Technical standards for MEC are being developed by the European Telecommunications Standards Institute (ETSI).

A key technique that enables users to access services in a MEC environment is local breakout. Local breakout provides the ability to redirect service traffic to one of the edge clouds hosting the service that is close to the user. Local breakout usually takes place at the user place function (UPF) in a 5th Generation (5G) mobile core network. Local breakout typically requires identifying/classifying service traffic and deciding whether the service traffic can be processed at an edge cloud, and if so which one.

When multiple instances of a service are hosted across multiple distributed edge clouds, there is a need to decide which edge cloud should process the service traffic. Currently, a centralized entity in the 5G mobile core network decides which edge cloud should process the service traffic. However, such a centralized decision-making approach has several drawbacks. For example, a drawback of the centralized decision-making approach is that the centralized entity needs to be able to process a potentially large number of queries regarding the local breakout decision, which might be difficult to achieve due to limited availability of computing and/or network resources, thereby creating a bottleneck in the network. Another drawback of the centralized decision-making approach is that it does not scale well as the number of edge clouds increase, as the centralized entity needs to operate on real-time data related to each of the edge clouds to make the local breakout decision. Yet another drawback of the centralized decision-making approach is that it adds delays in service delivery.

SUMMARY

A method by a user plane breakout function in a mobile core network for providing dynamic distributed local breakout, where the user plane breakout function is connected to one or more neighboring user plane breakout functions in the mobile core network. The method includes receiving, from the one or more neighboring user plane breakout functions, service instance information of one or more instances of a service that are accessible via other user plane breakout functions, receiving, from the one or more neighboring user plane breakout functions, processing capacity information of one or more edge clouds connected to other user plane breakout functions, receiving, from the one or more neighboring user plane breakout functions, link quality information of one or more links between other user plane breakout functions, calculating, for each of the one or more instances of the service, a service instance access score for that instance of the service based on the service instance information, the processing capacity information, and the link quality information, receiving, from a user equipment (UE) connected to the user plane breakout function, a request to access the service, determining an instance of the service that is considered to have the lowest access cost based on comparing the service instance access scores of the one or more instances of the service, and sending a response to the UE that includes a network address that can be used to access the instance of the service that is considered to have the lowest access cost.

A set of one or more non-transitory machine-readable storage media storing instructions which, when executed by one or more processors of a network device implementing a user plane breakout function in a mobile core network, causes the user plane breakout function to perform operations for providing dynamic distributed local breakout, where the user plane breakout function is connected to one or more neighboring user plane breakout functions in the mobile core network. The operations include receiving, from the one or more neighboring user plane breakout functions, service instance information of one or more instances of a service that are accessible via other user plane breakout functions, receiving, from the one or more neighboring user plane breakout functions, processing capacity information of one or more edge clouds connected to other user plane breakout functions, receiving, from the one or more neighboring user plane breakout functions, link quality information of one or more links between other user plane breakout functions, calculating, for each of the one or more instances of the service, a service instance access score for that instance of the service based on the service instance information, the processing capacity information, and the link quality information, receiving, from a user equipment (UE) connected to the user plane breakout function, a request to access the service, determining an instance of the service that is considered to have the lowest access cost based on comparing the service instance access scores of the one or more instances of the service, and sending a response to the UE that includes a network address that can be used to access the instance of the service that is considered to have the lowest access cost.

A network device configured to implement a user plane breakout function in a mobile core network that provides dynamic distributed local breakout, where the user plane breakout function is connected to one or more neighboring user plane breakout functions in the mobile core network. The network device incudes one or more processors and a non-transitory machine-readable storage medium having instructions stored therein, which when executed by the one or more processors, causes the user plane breakout function to receive, from the one or more neighboring user plane breakout functions, service instance information of one or more instances of a service that are accessible via other user plane breakout functions, receive, from the one or more neighboring user plane breakout functions, processing capacity information of one or more edge clouds connected to other user plane breakout functions, receive, from the one or more neighboring user plane breakout functions, link quality information of one or more links between other user plane breakout functions, calculate, for each of the one or more instances of the service, a service instance access score for that instance of the service based on the service instance information, the processing capacity information, and the link quality information, receive, from a user equipment (UE) connected to the user plane breakout function, a request to access the service, determine an instance of the service that is considered to have the lowest access cost based on comparing the service instance access scores of the one or more instances of the service, and send a response to the UE that includes a network address that can be used to access the instance of the service that is considered to have the lowest access cost.

BRIEF DESCRIPTION OF THE DRAWINGS

The invention may best be understood by referring to the following description and accompanying drawings that are used to illustrate embodiments of the invention. In the drawings:

FIG. 7 is a diagram illustrating communications between a user plane breakout function and its neighboring user plane breakout functions for sharing processing capacity information, according to some embodiments.

DETAILED DESCRIPTION

Figure 1:
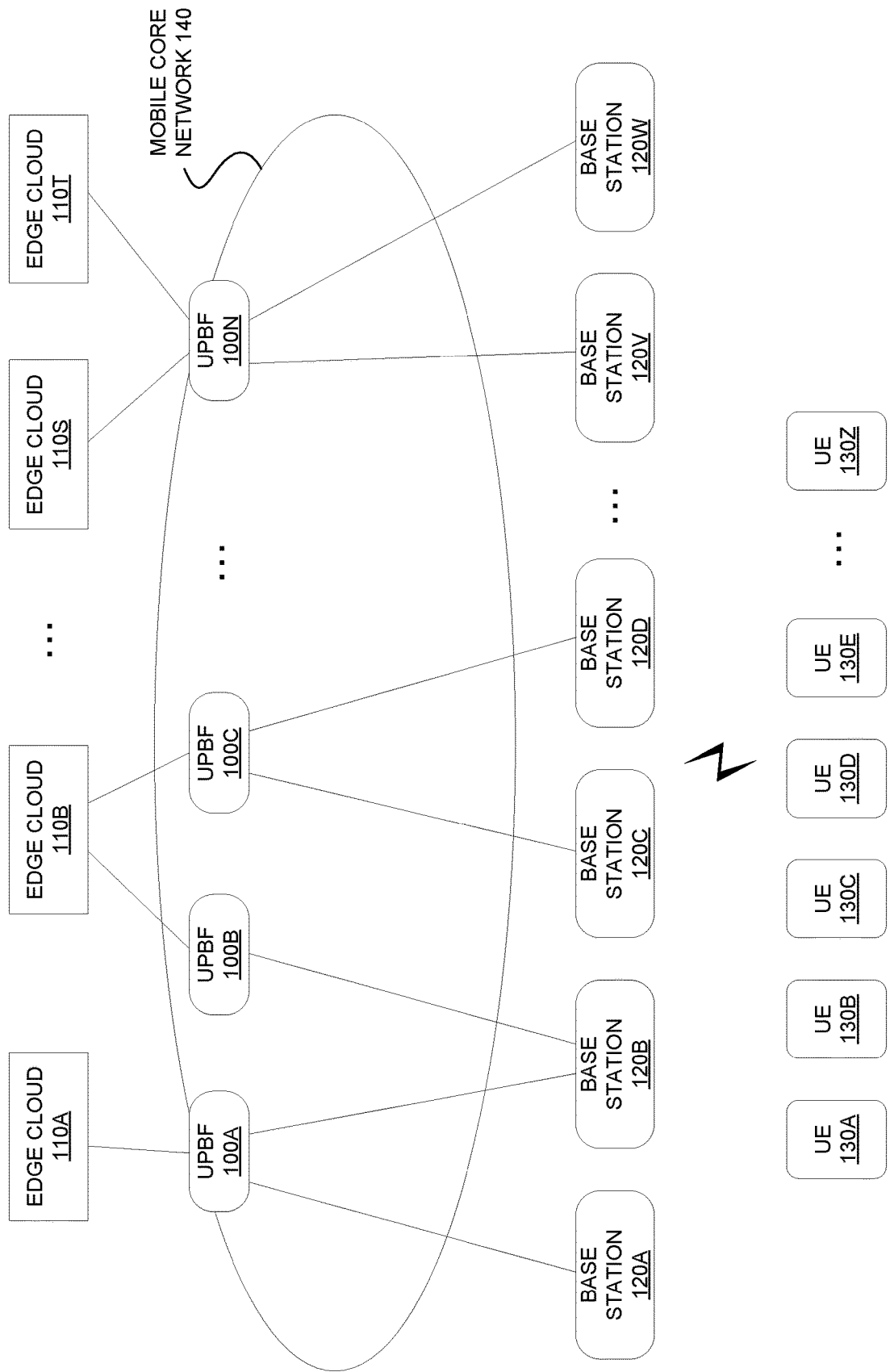
FIG. 1 is a block diagram illustrating a system in which dynamic distributed local breakout can be provided, according to some embodiments.

The following description describes methods and apparatus for providing dynamic distributed local breakout in a mobile core network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., where a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, when multiple instances of a service are hosted across multiple distributed edge clouds, there is a need to decide which edge cloud should process the service traffic. Currently, a centralized entity in the 5th Generation (5G) mobile core network decides which edge cloud should process the service traffic. However, a centralized decision-making approach has several drawbacks such as creating a bottleneck in the network, not scaling well with the increase in the number of edge clouds, and adding delays to service delivery.

Another approach to deciding which edge cloud should process service traffic is to make the decision locally at the user plane function (UPF) level. However, currently there is no mechanism for a UPF to know about state of edge clouds that are not directly connected to it, such as resource availability (e.g., central processing unit (CPU) and memory availability), service availability, data availability, and other factors that may affect the ability of the edge cloud to process service traffic. Edge clouds are often constrained in computing resources and different services have different service/performance requirements. However, UPFs are not able to take these factors into consideration.

The present disclosure describes mechanisms for providing dynamic distributed local breakout in a mobile core network. Embodiments allow user plane breakout functions to dynamically learn about instances of a service that are hosted on edge clouds connected to itself and other user plane breakout functions and decide which instance of the service should process service traffic. In making the decision, the user plane breakout function may take into account the current processing capacity of the edge clouds, as well as the latency and bandwidth requirements of the service. For example, if a service has higher latency tolerance or lower priority, then the user plane breakout function may decide that it is better to have the service traffic be processed by an instance of the service hosted on a remote edge cloud to opportunistically preserve the local edge cloud's resources for services that have lower latency tolerance or higher priority. Notably, embodiments do not require a centralized entity to make local breakout decisions. Instead, each user plane breakout function may decide in real-time which instance of a service should process service traffic based on the service requirements of the service, the processing capacities of edge clouds, and the latencies between itself and other user plane breakout functions.

An embodiment is a method by a user plane breakout function for providing dynamic distributed local breakout. The method includes receiving, from the one or more neighboring user plane breakout functions, service instance information of one or more instances of a service that are accessible via other user plane breakout functions, receiving, from the one or more neighboring user plane breakout functions, processing capacity information of one or more edge clouds connected to other user plane breakout functions, receiving, from the one or more neighboring user plane breakout functions, link quality information of one or more links between other user plane breakout functions, calculating, for each of the one or more instances of the service, a service instance access score for that instance of the service based on the service instance information, the processing capacity information, and the link quality information, receiving, from a user equipment (UE) connected to the user plane breakout function, a request to access the service, determining an instance of the service that is considered to have the lowest access cost based on comparing the service instance access scores of the one or more instances of the service, and sending a response to the UE that includes a network address that can be used to access the instance of the service that is considered to have the lowest access cost. Various embodiments are described herein below with reference the accompanying figures.

FIG. 1 is a block diagram illustrating a system in which dynamic distributed local breakout can be provided, according to some embodiments. As shown in the diagram, the system includes user equipment (UE) 130A-Z, base stations 120A-W, user plane breakout functions 100A-N in a mobile core network 140, and edge clouds 110A-T. A UE 130 is a device that can wirelessly connect to the base stations 120 over a radio interface. A UE can be, for example, a hand-held telephone (e.g., smartphone), a laptop computer equipped with a mobile broadband adapter, a fix wireless access equipment, or similar device. A base station 120 facilitates communication between UEs 130 and the mobile core network 140. In one embodiment, the base stations 120 are gNodeBs of a 5G mobile network. Each base station 120 is connected to one or more user plane breakout functions 100 within the mobile core network 140. A user plane breakout function 100 provides local breakout in the user plane, as will be described further herein. In one embodiment, the mobile core network 140 is a 5G mobile core network and each user plane breakout function 100 can be integrated in the 5G UPF or implemented as a separate entity. Each user plane breakout function 100 is connected to one or more edge clouds 110. An edge cloud 110 is a cloud computing system that is located at or near the edge of a network. Each edge cloud 110 may host one or more services. Also, multiple instances of a given service can be hosted across multiple different edge clouds 110. Each user plane breakout function 100 may be connected to one or more other user plane breakout functions 100. User plane breakout functions 100 that are directly connected to each other may be referred to herein as "neighboring" user plane breakout functions.

When an edge cloud 110 detects that a new instance of a service has started running on the edge cloud 110, it may send an indication that the instance of the service has started running to the user plane breakout functions 100 connected to it. This indication may include various information about the instance of the service such as a service identifier of the service (e.g., a domain name corresponding to the service), a network address that can be used to access the instance of the service (e.g., an Internet Protocol (IP) address that can be used to access the instance of the service), and a service cost profile of the service. The service cost profile of the service may include weights indicating the relative importance of different service performance factors such as processing capacity, bandwidth, and latency. As will be further described herein below, the service cost profile of the service may be used by user plane breakout functions 100 to calculate a service instance access score for an instance of a service. Thus, each user plane breakout function 100 may become aware of the services that are hosted on the edge clouds 110 connected to it.

A user plane breakout function 100 may send service instance information of service instances hosted on edge clouds 110 connected to it to its neighboring user plane breakout functions 100. The service instance information of an instance of a service may include the same or similar information that the user plane breakout function 100 received from the edge clouds 110 (e.g., service identifier, network address that can be used to access the instance of the service, and a service cost profile of the service), as well as the identifier of the user plane breakout function 100 (to indicate to the neighboring user plane breakout functions 100 that the instance of the service can be accessed via itself). The neighboring user plane breakout functions 100 may in turn send the service instance information it received to its neighboring user plane breakout functions 100. In this manner, service instance information can be propagated to all (or many) of the user plane breakout functions 100 in the mobile core network 140. This allows the user plane breakout functions 100 in the mobile core network 140 to become aware of the service instances that are hosted on the edge clouds 110.

An edge cloud 110 may send an indication of its processing capacity to its connected user plane breakout functions 100. This indication may include various information about the processing capacity of the edge cloud 110 such as CPU availability at the edge cloud 110, memory availability at the edge cloud 110, bandwidth availability at the edge cloud 110, and latency between the edge cloud 110 and the user plane breakout function 100.

A user plane breakout function 100 may send processing capacity information of edge clouds 110 to which it is connected to its neighboring user plane breakout functions 100. The processing capacity information of an edge cloud 110 may include the same or similar information that the user plane breakout function 100 received from the edge clouds 110 (e.g., CPU availability, memory availability, etc.). The neighboring user plane breakout functions 100 may in turn send the processing capacity information it received to its neighboring user plane breakout functions 100. In this manner, processing capacity information can be propagated to all (or many) of the user plane breakout functions 100 in the mobile core network 140. This allows the user plane breakout functions 100 in the mobile core network 140 to become aware of the processing capacities of the edge clouds 110 (even if a user plane breakout function 100 is not directly connected to that edge cloud 110).

A user plane breakout function 100 may measure the link quality of the links between itself and its neighboring user plane breakout functions 100. For example, the user plane breakout function 100 may measure the latency of the links and/or the bandwidth of the links. Latency and bandwidth can be measured using any suitable means. The user plane breakout function 100 may maintain a neighbor link quality table that stores the link quality measurements of links between itself and its neighboring user plane breakout functions 100. The user plane breakout function 100 may periodically update the link quality measurements in its neighbor link quality table with new measurements to reflect real-time link quality status.

The user plane breakout function 100 may send link quality information of the links between itself and its neighboring user plane breakout functions 100 to its neighboring user plane breakout functions 100. The link quality information of a link may include link quality metrics of the link (e.g., latency metric and/or bandwidth metric). The neighboring user plane breakout functions 100 may in turn send this link quality information to its neighboring user plane breakout functions 100. In this manner, link quality information can be propagated to all (or many) of the user plane breakout functions 100 in the mobile core network 140. This allows the user plane breakout functions 100 in the mobile core network 140 to become aware of the link qualities of the links between different user plane breakout functions 100.

A user plane breakout function 100 may also maintain a network condition table that stores the best link quality metrics of links between itself and other user plane breakout functions 100 in the mobile core network 140. The user plane breakout function 100 may calculate the best link quality metrics, for example, based on receiving multiple iterations of link quality information from its neighboring user plane breakout functions 100, building a view of the link qualities of the links between itself and other user plane breakout functions 100, and applying a shortest path three (SPT) algorithm or similar algorithm to determine the links/paths having the best link qualities.

A user plane breakout function 100 may calculate a service instance access score for each instance of a service based on service instance information, capacity information, and link quality information. In an embodiment, the service instance access score for an instance of a service is calculated as a weighted sum of an edge cloud processing capacity score, a latency score, and a bandwidth score. The edge cloud processing capacity score may be calculated as a weighted sum of processing capacity metrics of the edge cloud 110 hosting the instance of the service (e.g., weighted sum of CPU availability metric and memory availability metric), which is normalized to be between 0 and 100 (0 being the worst and 100 being the best). For example, if an edge cloud 110 has a total of 60 processing cores with 30 of them available, then the CPU availability metric may be 50 ((30/60)*100)=50). As another example, if the edge cloud 110 has total memory of 120 Gigabytes (GB) and 72 GB of it is free, then the memory availability metric may be 60 ((72/120)*100)).

The latency score may be calculated as follows:
Latency_Score=(1−(Link_Metric.Latency/Service_Cost_Profile.MaxLatency))*100

In the above, Latency_Score is the latency score, Link_Metric.Latency is the latency of the link (to the user plane breakout function 100 via which the instance of the service can be accessed), and Service_Cost_Profile.MaxLatency is the maximum tolerable latency for the service (which may be indicated in the service cost profile of the service). The Latency_Score can be a value between 0 and 100 (with 0 being the worst and 100 being the best). A negative value for Latency_Score may be set to 0.

The bandwidth score may be calculated as follows:
Set BestBandwidth=Service_Cost_Profile.MinBandwidth*bw_scale_factor
IF Link Metric.Bandwidth>=BestBandwidth
Bandwidth Score=100
ELSE
Bandwidth_Score=(Link_Metric.Bandwidth/BestBandwidth)*100

In the above, BestBandwidth is the bandwidth that is considered to be the best bandwidth for the service, Service_Cost_Profile.MinBandwidth is the minimum acceptable bandwidth (which may be indicated in the service cost profile of the service), bw_scale_factor is a bandwidth scaling factor, Link_Metric.Bandwidth is the bandwidth of the link (to the user plane breakout function 100 via which the instance of the service can be accessed), and Bandwidth Score is the bandwidth score. The bw_scale_factor is a tunable parameter that when multiplied by the minimum acceptable bandwidth (Service_Cost_Profile.MinBandwidth) yields the bandwidth that is considered to be the best bandwidth for the service (BestBandwidth). For example, if bw_scale_factor is set to 10, then a bandwidth that is ten times the minimum acceptable bandwidth is considered to be the best bandwidth for the service. The Bandwidth Score can be a value between 0 and 100 (with 0 being the worst and 100 being the best).

The service instance access score can then be calculated as the weighted sum of the edge cloud processing capacity score, the latency score, and the bandwidth score using the weights in the service cost profile of the service. For example, the service instance access score may be calculated as follows:
Service_Access_Score=Service_Cost_Profile.Compute_Capacity*EdgeCapacity_Score+
Service_Cost_Profile.Bandwidth*Bandwidth Score+
Service_Cost_Profile.Latency*Latency_Score In the above, Service_Access_Score is the service instance access score, Service_Cost_Profile.Compute_Capacity is the weight for the edge cloud processing capacity score, EdgeCapacity_Score is the edge cloud processing capacity score, Service_Cost_Profile.Bandwidth is the weight for the bandwidth score, Bandwidth_Score is the bandwidth score, Service_Cost_Profile.Latency is the weight for the latency score, and Latency_Score is the latency score.

A user plane breakout function 100 may maintain a service flow forwarding table that stores information about the service instances that are available and the calculated service instance access scores for those service instances.

When a user plane breakout function 100 receives a request from a UE 130 connected to it (via a base station 120) to access a service, the user plane breakout function 100 may determine, based on performing a look up the service flow forwarding table, an instance of the service that is considered to have the lowest access cost (e.g., highest service instance access score) based on comparing the service instance access scores of different instances of the service. The user plane breakout function 100 may then send a response to the UE 130 that includes a network address (e.g., IP address) that can be used to access the instance of the service that is considered to have the lowest access cost. The UE 130 may then access the service using the network address included in the response.

Embodiments thus allow each user plane breakout function 100 to dynamically learn about service instances hosted across multiple distributed edge clouds 110 and to make local breakout decisions that take into consideration the processing capacity of the edge clouds 110, the link qualities, and the service requirements of the service.

Embodiments may provide several benefits. For example, embodiments may provide distributed and swift decision making on where to break out traffic and towards which edge cloud 110, automatic setup of local breakout and forwarding rules at the user plane breakout functions 100, better load balancing and scaling of services at edge clouds 110 as the result of coordination between multiple user plane breakout functions 100, automatic service discovery as the result of user plane breakout function 100 coordination, which removes the need for a centralized entity to make local breakout decisions, and/or more opportunistic utilization of edge cloud resources (embodiments have the ability to prioritize certain service traffic to satisfy service requirements).

Figure 2:
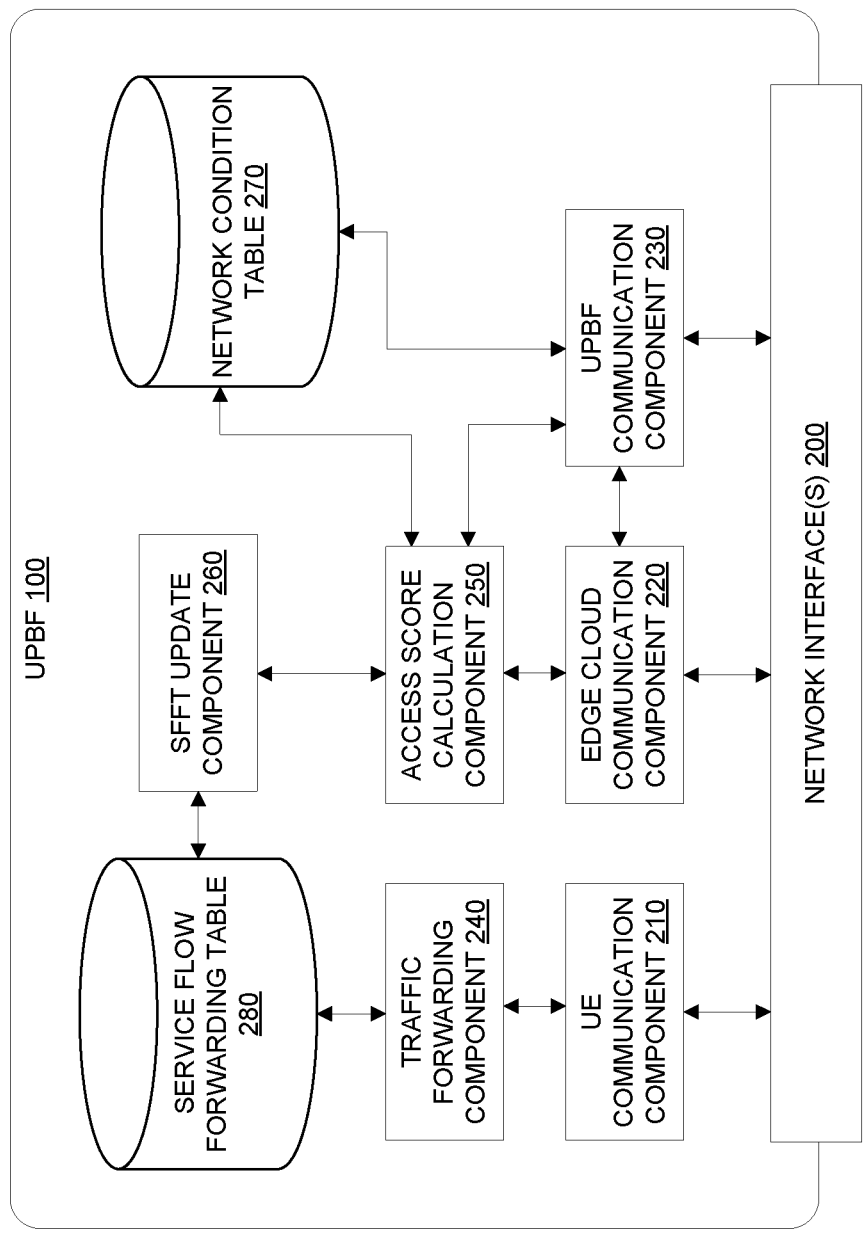
FIG. 2 is a block diagram illustrating components of a user plane breakout function, according to some embodiments.

FIG. 2 is a block diagram illustrating components of a user plane breakout function, according to some embodiments. As shown in the diagram, the user plane breakout function 100 includes network interface(s) 200, UE communication component 210, edge cloud communication component 220, user plane breakout function (UPBF) communication component 230, a traffic forwarding component 240, an access score calculation component 250, a service flow forwarding table (SFFT) update component 260, a network condition table 270, and a service flow forwarding table 280. The UE communication component 210, edge cloud communication component 220, and user plane breakout function communication component 230 are communicatively coupled to the network interface(s) and manage/facilitate communications with UEs 130 (via base stations 120), edge clouds 110, and neighboring user plane breakout functions 100, respectively, over the network interface(s) 200. The access score calculation component 250 is communicatively coupled to the network condition table 270, the edge cloud communication component 220, and the user plane breakout function communication component 230. The user plane breakout function communication component 230 may receive service instance information, processing capacity information, and link quality information sent by neighboring user plane breakout functions 100. The user plane breakout function communication component 230 is communicatively coupled to the network condition table 270, which stores an indication of link qualities of the links to other user plane breakout functions 100 (e.g., which can be calculated based on link quality measurements made by the user plane breakout function 100 itself and/or the link quality information received from neighboring user plane breakout functions 100). The edge cloud communication component 220 may receive indications of service instances hosted on the edge cloud(s) 110 connected to the user plane breakout function 100 and indications of the processing capacities of the edge cloud(s) 110. The edge cloud communication component 220 is communicatively coupled to the user plane breakout function communication component 230 and can send information it received from the edge cloud(s) 110 to the user plane breakout function communication component 230 for sending to neighboring user plane breakout functions 100. The access score calculation component 250 may receive or otherwise have access to service instance information, processing capacity information, and link quality information (e.g., obtained from the network condition table 270, the edge cloud communication component 220, and/or the user plane breakout function communication component 230). The access score calculation component 250 may calculate a service instance access score for each known service instance based on the service instance information (e.g., service cost profiles of services), processing capacity information, and link quality information. The access score calculation component 250 is communicatively coupled to the service flow forwarding table update component 260 and may provide the calculated service instance access scores to the service flow forwarding table update component 260. The service flow forwarding table update component 260 is communicatively coupled to the service flow forwarding table 280 and may update the service flow forwarding table 280 with the service instance access scores received from the access score calculation component 250. The user plane breakout function 100 may be implemented using one or more network devices.

The UE communication component 210 is communicatively coupled to the traffic forwarding component 240. The UE communication component 210 may receive requests from UEs 130 to access services and provide these requests to the traffic forwarding component 240. The traffic forwarding component 240 is communicatively coupled to the service flow forwarding table 280 and may determine which service instance the UEs should access based on performing a lookup in the service flow forwarding table 280. For example, the traffic forwarding component 240 may choose, for the UE 130, the instance of a service that is considered to have the lowest access cost based on comparing service instance access scores of different instances of the service. The traffic forwarding component 240 may then generate a response to be sent to the UE 130 that includes a network address that can be used by the UE 130 to access the chosen instance of the service and provide this response to the UE communication component 210 to be sent to the UE 130 over the network interface(s) 200.

Figure 3:
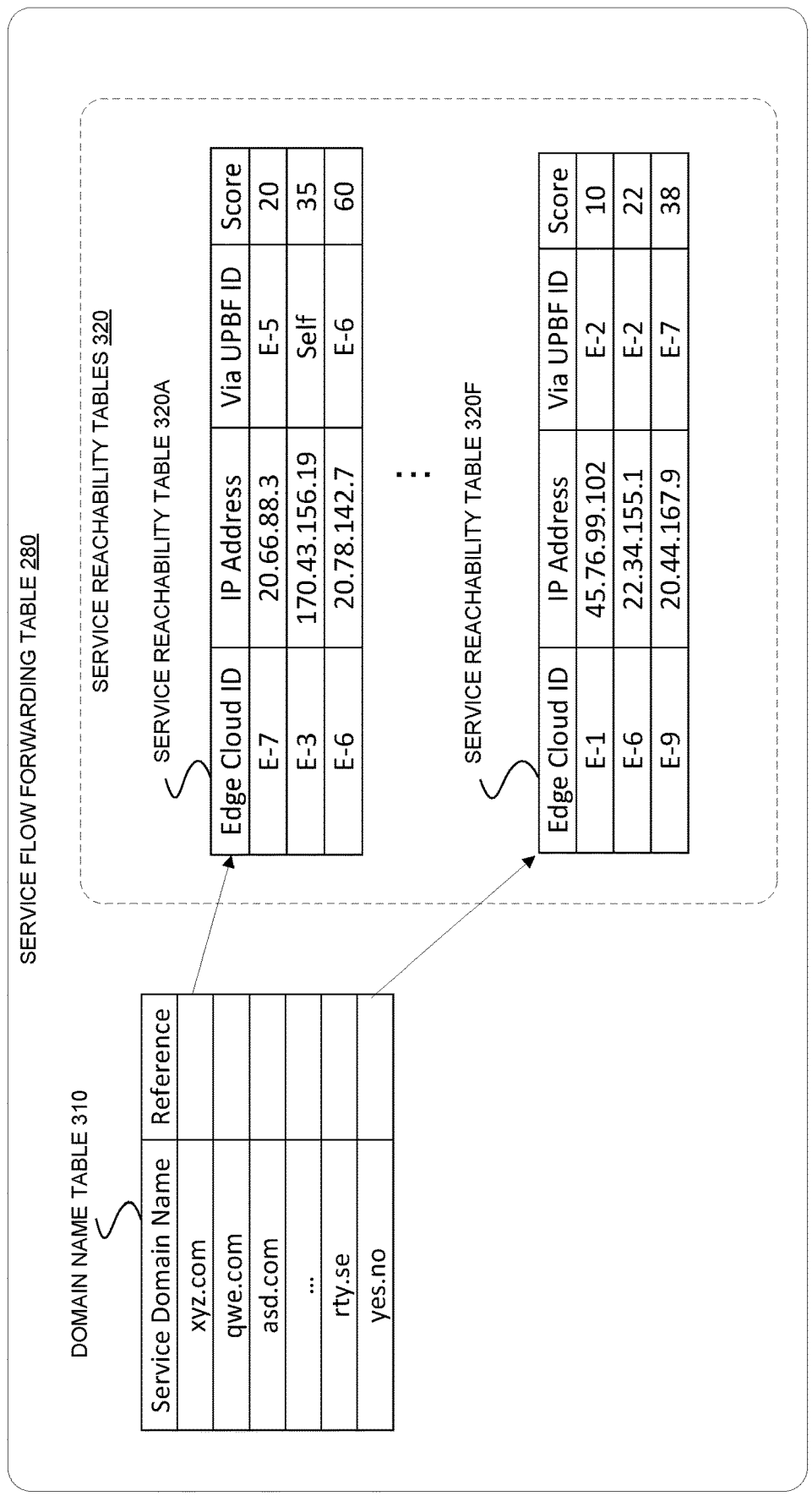
FIG. 3 is a diagram illustrating a service flow forwarding table, according to some embodiments.

FIG. 3 is a diagram illustrating a service flow forwarding table, according to some embodiments. As shown in the diagram, the service flow forwarding table 280 includes a domain name table 310 and multiple service reachability tables 320A-F. The domain name table 310 includes columns for a service domain name and a reference to a service reachability table 320. Each service reachability table 320 includes columns for an edge cloud ID, an IP address, a UPBF ID, and a score. In the depicted example, the domain name table 310 includes entries for domain names "xyz.com," "qwe.com," "asd.com," "rty.se," and "yes.no" (each of which correspond to a different service) Also, in the depicted example, the entry for domain name "xyz.com" points to service reachability table 320A and the entry for domain name "yes.no" points to service reachability table 320F. Each entry in a service reachability table 320 corresponds to an instance of a service. In the depicted example, service reachability table 320A includes entries for three instances of the service corresponding to domain name "xyz.com". The first entry indicates that there is an instance of the service that is hosted by edge cloud 110 having edge cloud ID E-7, that can be accessed using IP address "20.66.88.3" via UPBF having UPBF ID E-5, and having an access score of 20. The other entries in service reachability table 320A can be interpreted in a similar manner. Service reachability table 320F can be interpreted in a similar manner to service reachability table 320A as described above, and thus is not further described herein for the sake of conciseness.

Figure 4:
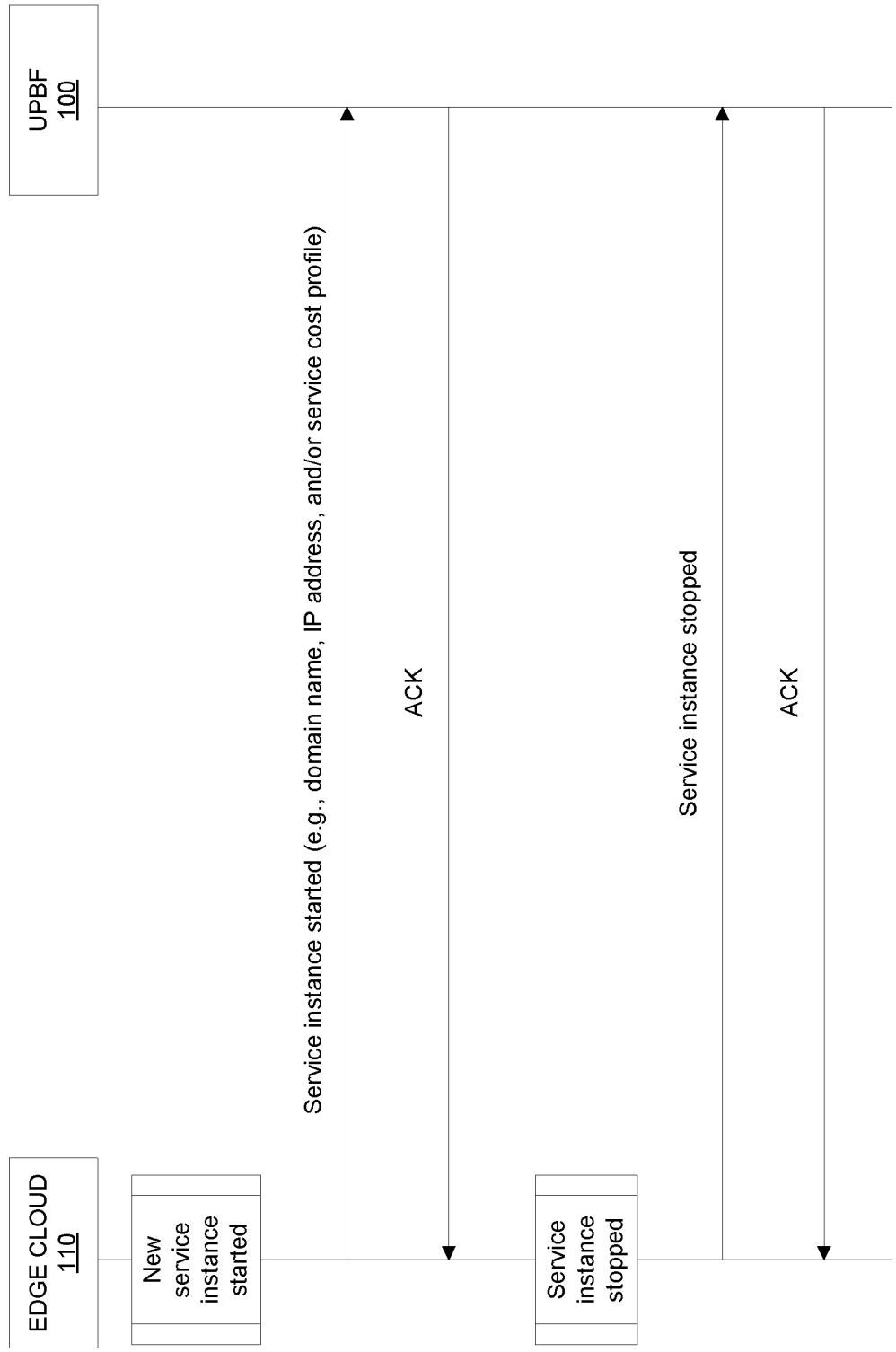
FIG. 4 is a diagram illustrating communications between an edge cloud and a user plane breakout function for indicating when an instance of a service has started running and stopped running on the edge cloud, according to some embodiments.

FIG. 4 is a diagram illustrating communications between an edge cloud and a user plane breakout function for indicating when an instance of a service has started running and stopped running on the edge cloud, according to some embodiments. As shown in the diagram, if the edge cloud 110 detects that a new instance of a service has started running on the edge cloud 110, it sends an indication to the user plane breakout function 100 that the new instance of the service has started running. This indication may include information regarding the instance of the service such as the domain name corresponding to the service, the IP address that can be used to reach the instance of the service, and/or a service cost profile of the service. The user plane breakout function 100 may send an acknowledgement ("ACK") to the edge cloud 110 if it successfully receives the indication that the new instance of the service has started running.

As further shown in the diagram, if the edge cloud 110 subsequently detects that the instance of the service has stopped running on the edge cloud 110, it sends an indication to the user plane breakout function 100 that the instance of the service has stopped running. The user plane breakout function 100 may send an acknowledgement ("ACK") to the edge cloud 110 if it successfully receives the indication that the instance of the service has stopped running.

Figure 5:
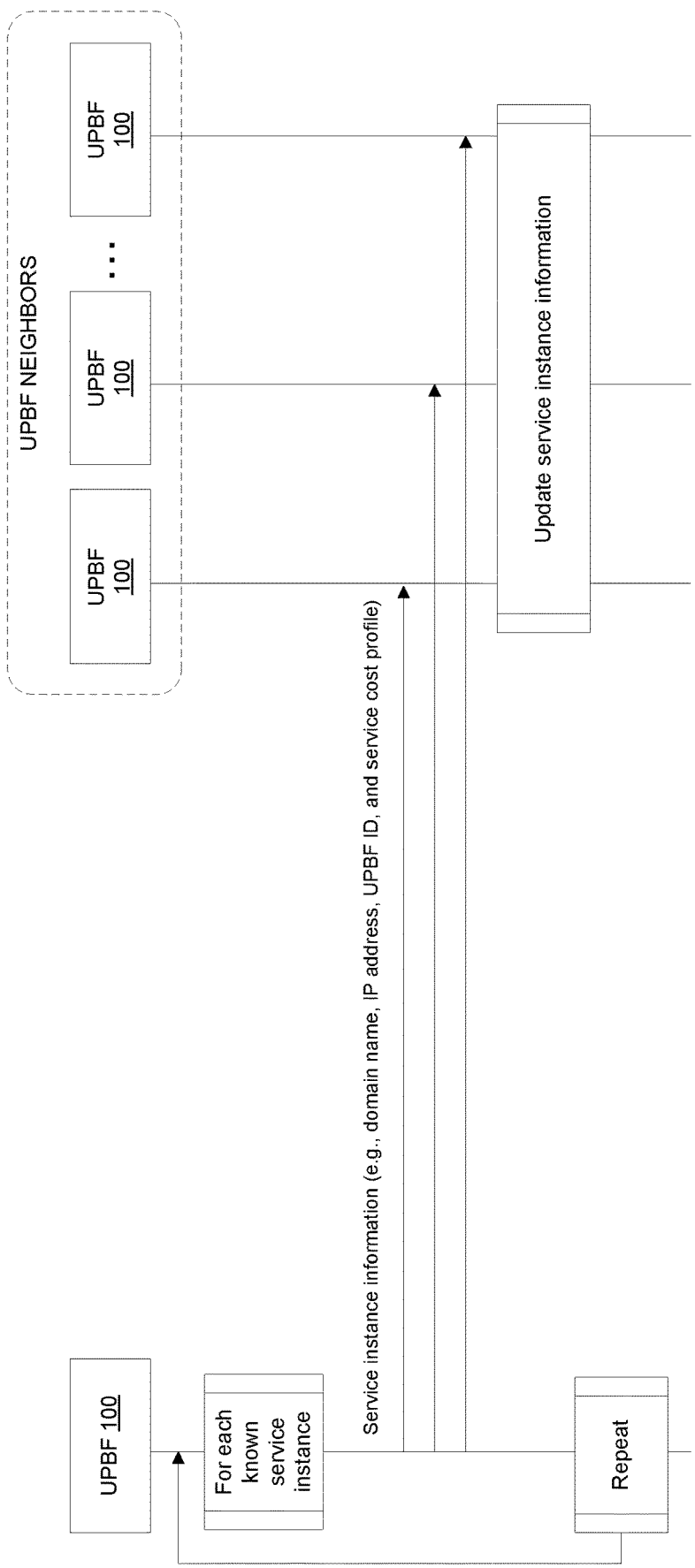
FIG. 5 is a diagram illustrating communications between a user plane breakout function and its neighboring user plane breakout functions for sharing service instance information, according to some embodiments.

FIG. 5 is a diagram illustrating communications between a user plane breakout function and its neighboring user plane breakout functions for sharing service instance information, according to some embodiments. As shown in the diagram, for each service instance known to the user plane breakout function 100, the user plane breakout function 100 sends service instance information of that instance to its neighboring user plane breakout functions. The service instance information of an instance may include the domain name corresponding to the service, the IP address that can be used to reach the instance of the service, the user plane breakout function ID of the user plane breakout function via which the instance of the service can be accessed, and the service cost profile of the service. The neighboring user plane breakout functions may then update their respective service instance information. The user plane breakout function 100 may repeat the process of sending service instance information to its neighboring user plane breakout functions, for example, periodically and/or in response to certain triggering events (e.g., when there has been a change in the service instance information).

Figure 6:
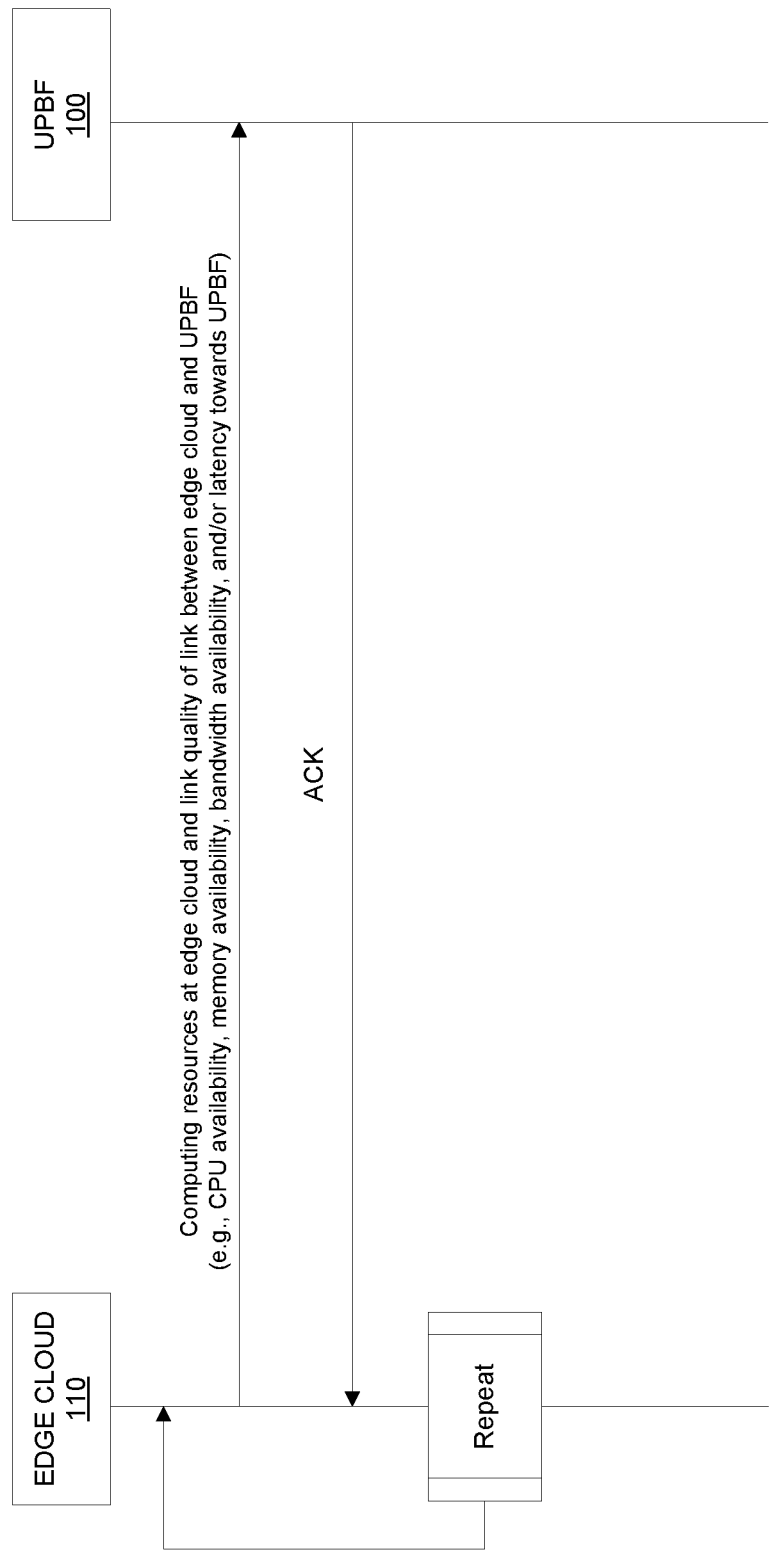
FIG. 6 is a diagram illustrating communications between an edge cloud and a user plane breakout function for indicating processing capacity of the edge cloud, according to some embodiments.

FIG. 6 is a diagram illustrating communications between an edge cloud and a user plane breakout function for indicating processing capacity of the edge cloud, according to some embodiments. As shown in the diagram, the edge cloud 110 sends an indication of its processing capacity (which may include the computing resources available at the edge cloud and the link quality of the link between the edge cloud 110 and the user plane breakout function 100) to the user plane breakout function 100. For example, the indication of the processing capacity of the edge cloud 110 may include CPU availability at the edge cloud 110, memory availability at the edge cloud 110, bandwidth availability at the edge cloud 110, and/or latency between the edge cloud 110 and the user plane breakout function 100. The user plane breakout function 100 may send an acknowledgement ("ACK") to the edge cloud 110 if it successfully receives the indication of the processing capacity of the edge cloud 110. The edge cloud 110 may repeat the process of sending an indication of its processing capacity to the user plane breakout function 100, for example, periodically and/or in response to certain triggering events (e.g., when there has been a change in the processing capacity of the edge cloud 110).

FIG. 7 is a diagram illustrating communications between a user plane breakout function and its neighboring user plane breakout functions for sharing processing capacity information, according to some embodiments. As shown in the diagram, for each edge cloud 110 known to the user plane breakout function 100, the user plane breakout function 100 sends processing capacity information of that edge cloud 110 (which may include information regarding the computing resources available at the edge cloud and information regarding the link quality of the link between the edge cloud 110 and the user plane breakout function 100) to its neighboring user plane breakout functions. For example, the processing capacity information of an edge cloud 110 may include the CPU availability at the edge cloud 110, the memory availability at the edge cloud 110, the bandwidth availability at the edge cloud 110, and/or the latency between the edge cloud 110 and the user plane breakout function 100. The neighboring user plane breakout functions may then update their respective processing capacity information. The user plane breakout function 100 may repeat the process of sending processing capacity information to its neighboring user plane breakout functions, for example, periodically and/or in response to certain triggering events (e.g., when there has been a change in the processing capacity information).

Figure 8A:
FIG. 8A is a diagram illustrating a neighbor link quality table, according to some embodiments.

FIG. 8A is a diagram illustrating a neighbor link quality table, according to some embodiments. As shown in the diagram, the neighbor link quality table 810 includes a neighbor column for indicating a neighboring user plane breakout function, a latency column for indicating the latency of the link to the neighboring user plane breakout function, and a bandwidth column for indicating the bandwidth available on the link to the neighboring user plane breakout function. Each row in the neighbor link quality table 810 indicates the link quality of a link to a given neighbor of the user plane breakout function 100. For example, the first row in the neighbor link quality table 810 indicates that the link to UPBF-7 has a latency of 3 ms (millisecond) and a bandwidth of 900 Mbps (megabits per second), the second row in the neighbor link quality table 810 indicates that the link to UPBF-2 has a latency of 1 ms and a bandwidth of 1200 Mbps, and so on.

Figure 8B:
FIG. 8B is a diagram illustrating a network condition table, according to some embodiments.

FIG. 8B is a diagram illustrating a network condition table, according to some embodiments. As shown in the diagram, the network condition table 270 includes a user plane breakout function (UPBF) column for indicating a neighboring user plane breakout function, a latency column for indicating the latency of the link to that user plane breakout function, and a bandwidth column for indicating the bandwidth available on the link to that user plane breakout function. Each row in the table indicates the link quality of the link to a given user plane breakout function having the best link quality. In the depicted example, the first three rows of the network condition table 270 are the same as the first three rows of the neighbor link quality table 810 (these rows indicate link qualities of links to neighboring user plane breakout functions). The network condition table 270 in this example also indicates link qualities of links to other user plane breakout functions that are not neighbors. For example, the fourth row of the network condition table 270 indicates that the best link to UPBF-1 has a latency of 9 ms and a bandwidth of 700 Mbps, the fifth row in the table indicates that the best link to UPBF-11 has a latency of 3 ms and a bandwidth of 1000 Mbps, and so on. The network condition table 270 may have been populated based on receiving link quality information from neighboring user plane breakout functions and applying a SPT algorithm to determine the links/paths having the best link qualities.

Figure 9:
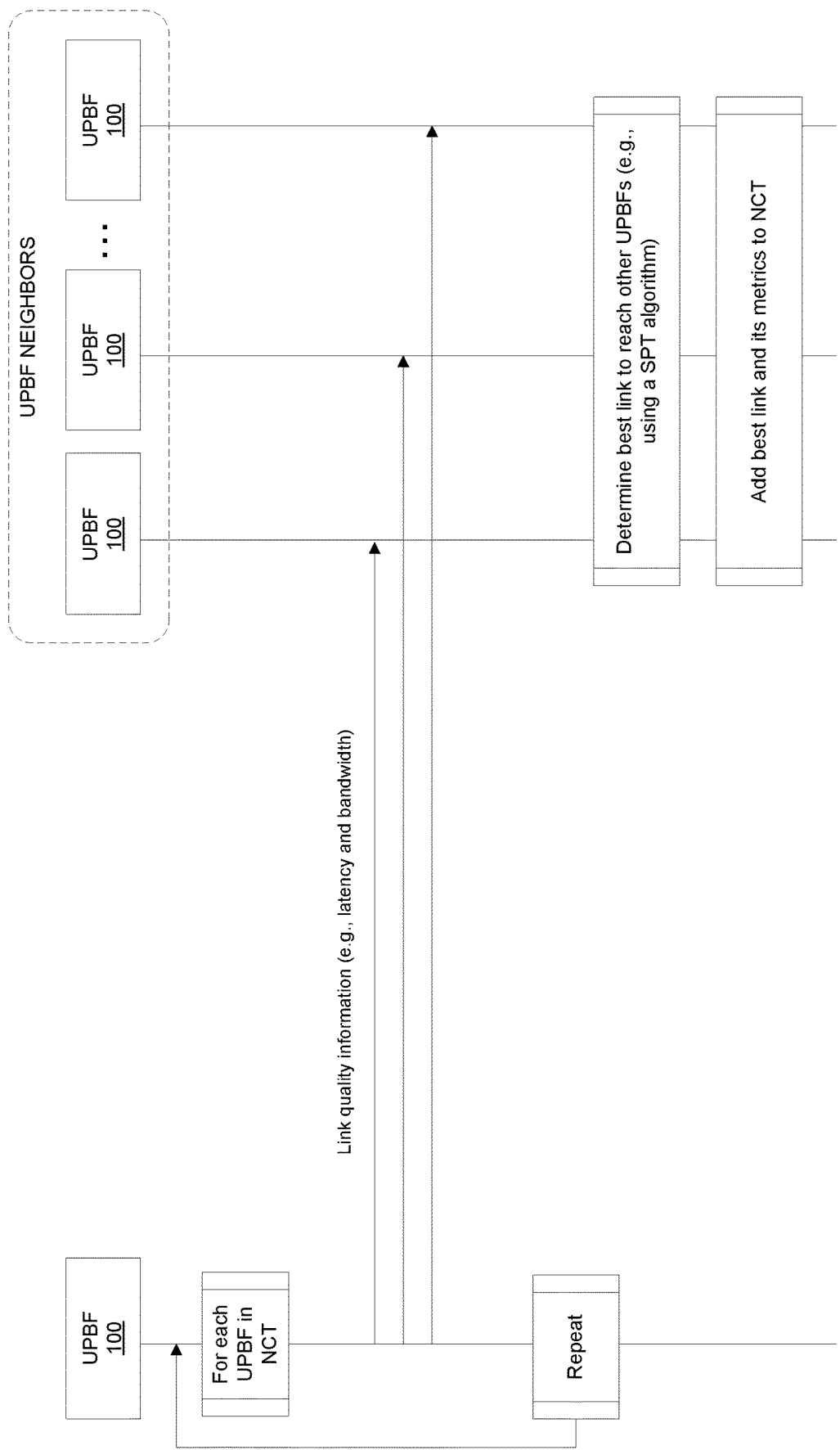
FIG. 9 is a diagram illustrating communications between a user plane breakout function and its neighboring user plane breakout functions for sharing link quality information, according to some embodiments.

FIG. 9 is a diagram illustrating communications between a user plane breakout function and its neighboring user plane breakout functions for sharing link quality information, according to some embodiments. As shown in the diagram, for each user plane breakout function in its network condition table 270, the user plane breakout function 100 (the user plane breakout function maintaining the network condition table) sends link quality information of the link to that user plane breakout function to its neighboring user plane breakout functions. The link quality information of a link may include information about the latency of the link and/or bandwidth of the link. The neighboring user plane breakout functions may then use the link quality information to determine the best link to reach other user plane breakout functions (e.g., by applying a SPT algorithm) and add the best links to their respective network condition tables. The user plane breakout function 100 may repeat the process of sending link quality information to its neighboring user plane breakout functions, for example, periodically and/or in response to certain triggering events (e.g., when there has been a change in link quality stored in its network condition table).

Figure 10:
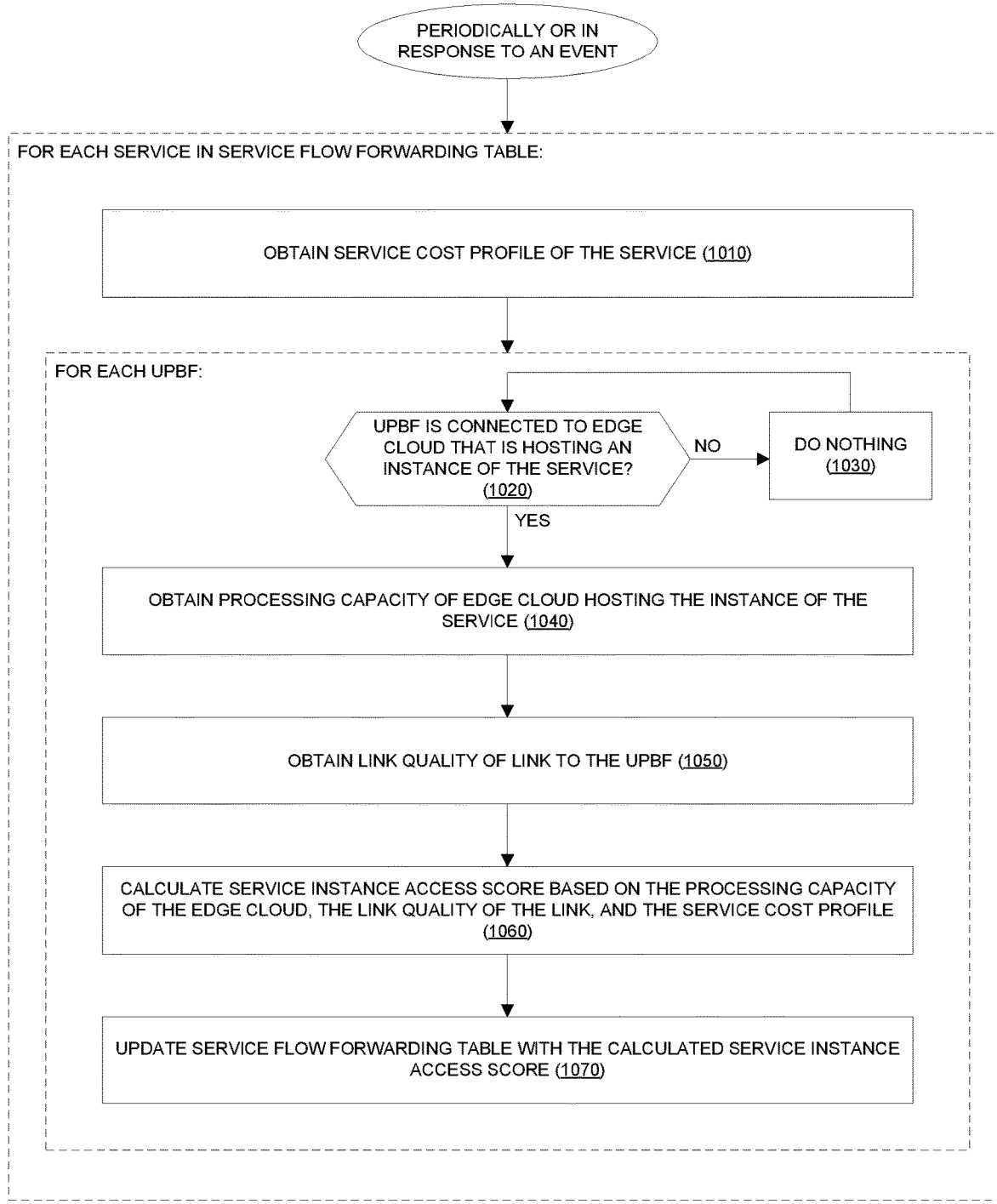
FIG. 10 is a flow diagram of a process for calculating a service instance access score, according to some embodiments.

FIG. 10 is a flow diagram of a process for calculating a service instance access score, according to some embodiments. The operations in the flow diagrams will be described with reference to the exemplary embodiments of the other figures. However, it should be understood that the operations of the flow diagrams can be performed by embodiments other than those discussed with reference to the other figures, and embodiments discussed with reference to these other figures can perform operations different than those discussed with reference to the flow diagrams.

The process may be implemented by a user plane breakout function referred herein as the "current" user plane breakout function 100. The process may be repeated periodically or in response to a triggering event. For each service in its service flow forwarding table 280, at block 1010, the current user plane breakout function 100 obtains a service cost profile of the service. Then for each user plane breakout function known to the current user plane breakout function 100, at block 1020, the current user plane breakout function 100 checks whether that user plane breakout function is connected to an edge cloud 110 that is hosting an instance of the service. If not, at block 1030, the current user plane breakout function 100 does nothing (and can move on to checking the next user plane breakout function). However, if that user plane breakout function is connected to an edge cloud 110 that is hosting an instance of the service, at block 1040, the current user plane breakout function 100 obtains the processing capacity of the edge cloud 110 hosting the instance of the service. At block 1050, the current user plane breakout function 100 also obtains the link quality of the link to that user plane breakout function. At block 1060, the current user plane breakout function 100 calculates a service instance access score for the instance of the service based on the processing capacity of the edge cloud 110, the link quality of the link, and the service cost profile. At block 1070, the current user plane breakout function 100 updates its service flow forwarding table 280 with the calculated service instance access score.

Figure 11:
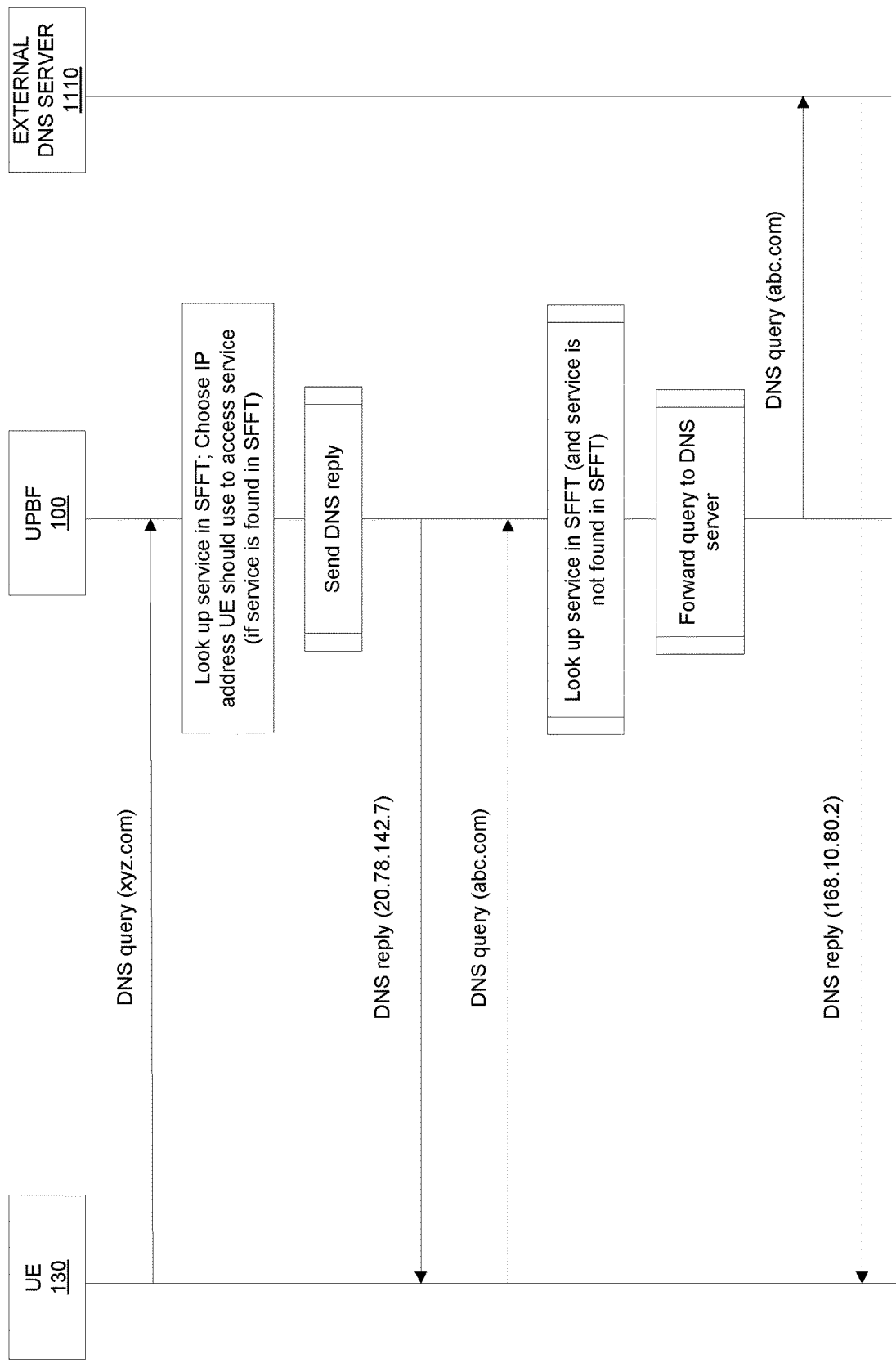
FIG. 11 is a diagram illustrating communications between a UE and a user plane breakout function for providing DNS replies to DNS queries, according to some embodiments.

FIG. 11 is a diagram illustrating communications between a UE and a user plane breakout function for providing domain name service (DNS) replies to DNS queries, according to some embodiments. As shown in the diagram, the UE 130 sends a DNS query for "xyz.com" to the user plane breakout function 100. The user plane breakout function 100 looks up the service (identified by the domain name "xyz.com") in its service flow forwarding table 280 to check if the service is found therein. In this example, the service is found in the service flow forwarding table 280 so the user plane breakout function 100 chooses an IP address that the UE 130 can use to access an instance of the service. The user plane breakout function then sends a DNS reply to the UE that includes the chosen IP address ("20.78.142.7" in this example since this is the instance of the service that has the highest access score in the service flow forwarding table 280). Also, as shown in the diagram, the UE 130 sends a DNS query for "abc.com" to the user plane breakout function 100. The user plane breakout function 100 looks up the service in its service flow forwarding table 280 to check if the service is found therein. In this example, the service is not found in the service flow forwarding table 280 so the user plane breakout function 100 forwards the DNS query to an external DNS server 1110. The DNS server 1110 then sends a DNS reply to the UE 130, which includes an IP address ("168.10.80.2" in this example) that can be used to access an instance of the service.

Figure 12:
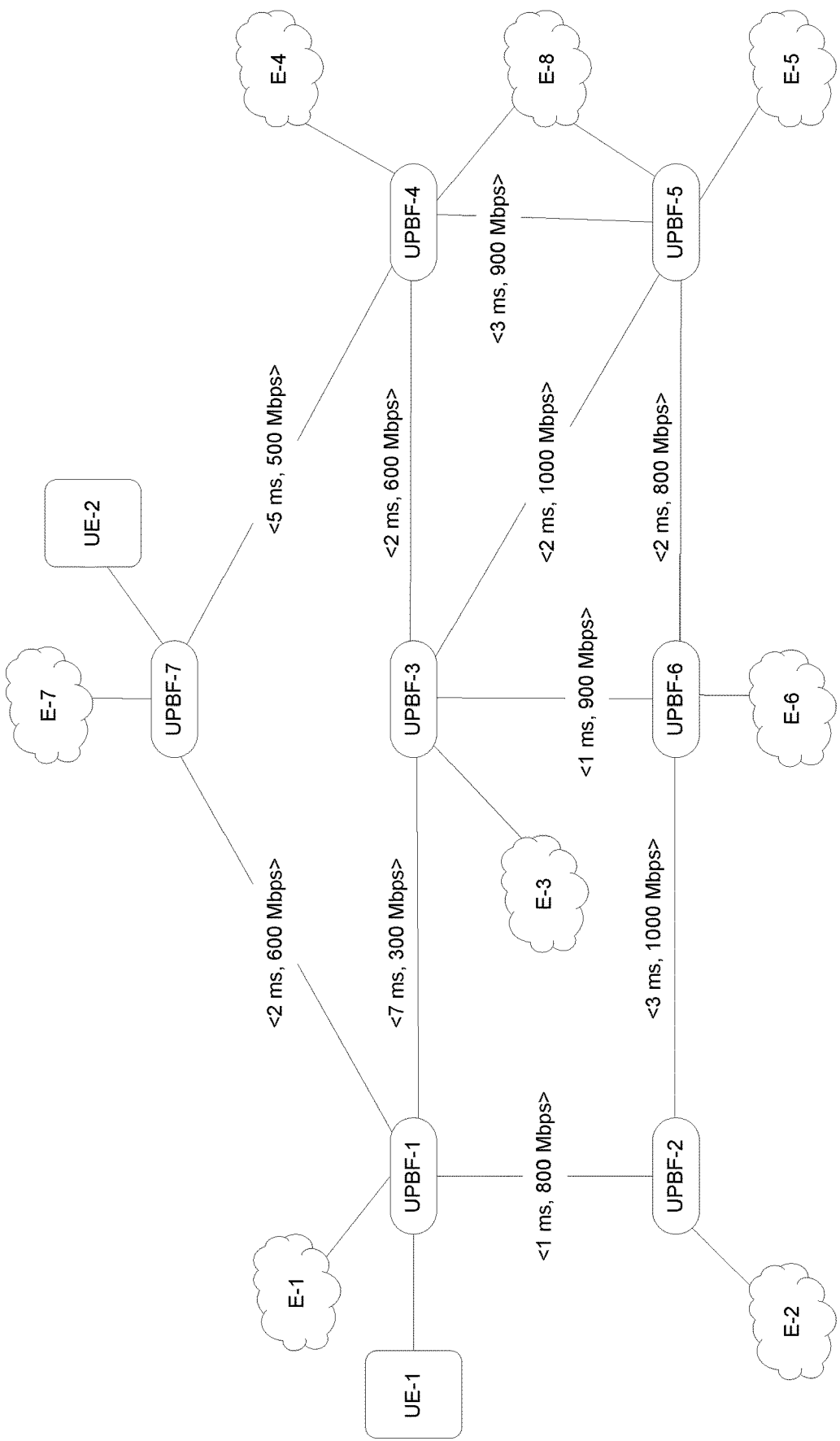
FIG. 12 is a diagram illustrating an example network topology, according to some embodiments.

FIG. 12 is a diagram illustrating an example network topology, according to some embodiments. The network topology includes seven user plane breakout functions (UPBF-1, UPBF-2, . . . , and UPBF-7) and eight edge clouds (E-1, E-2, . . . , and E-8), which are connected by links as shown. The links between the user plane breakout functions are marked in the diagram with their respective link qualities in the format <latency, bandwidth>. For example, the link between UPBF-1 and UPBF-2 is marked "<2 ms, 600 Mbps>", which indicates that link has latency of 2 ms and bandwidth of 600 Mbps. The topology also includes two UEs (UE-1 and UE-2) connected to UPBF-1 and UPBF-7, respectively. For sake of simplicity, the base stations have been omitted from the diagram. Also, for sake of simplicity, that the link qualities of the links are the same in both directions. It should be understood, however, that in actual network deployments, the link quality of a link can differ depending on the direction.

Each of the user plane breakout functions 100 may maintain a neighbor link quality table 810. As an example, the neighbor link quality tables of UPBF-1 and UPBF-7 are shown below.

| UPBF-1 Neighbor Link Quality Table ||
| UPBF ID | Link Metric <Latency (ms), Bandwidth (Mbps)> |
| --- | --- |
| UPBF-2 | <1,800> |
| UPBF-3 | <7,300> |
| UPBF-7 | <2,600> |

| UPBF-7 Neighbor Link Quality Table ||
| UPBF ID | Link Metric <Latency (ms), Bandwidth (Mbps)> |
| --- | --- |
| UPBF-1 | <2,600> |
| UPBF-4 | <5,500> |

Each user plane breakout function 100 may periodically update its neighbor link quality table 810 based on measuring link qualities of links to its neighboring user plane breakout functions. Also, each user plane breakout function 100 may share measured link qualities with its neighboring user plane breakout functions.

Each of the user plane breakout functions 100 may maintain a network condition table 270, which stores the best link(s) to other user plane breakout functions. A user plane breakout function 100 may build its network condition table 270 over multiple iterations of receiving link quality information from neighboring user plane breakout functions and applying a SPT algorithm or similar algorithm to determine the link(s) having the best link qualities.

As an example, the network condition tables of UPBF-1 and UPBF-7 after a few iterations of receiving the link quality information from their neighbors are shown below. It should be noted that the number of iterations required to have a complete network view depends on the size and topology of the network.

| UPBF-1 Network Condition Table ||
| UPBF ID | Metrics |
| --- | --- |
| UPBF-2 | <1,800> |
| UPBF-3 | <5,800> |
| UPBF-4 | <7,600> \| <10,800> |
| UPBF-5 | <6,800> |
| UPBF-6 | <4,800> |
| UPBF-7 | <2,600> |

| UPBF-7 Network Condition Table ||
| UPBF ID | Metrics |
| --- | --- |
| UPBF-1 | <2,600> |
| UPBF-2 | <3,600> |
| UPBF-3 | <7,600> |
| UPBF-4 | <5,500> \| <9,600> |
| UPBF-5 | <8,500> \| <9,600> |
| UPBF-6 | <6,600> |

In the network condition table of UPBF-1, there are two entries for UPBF-4, where one entry provides the best metric in terms of latency and the other provides the best metric in terms of bandwidth. In the network condition table of UPBF-7, there are two entries for UPBF-4 and UPBF-5, where one entry provides the best metric in terms of latency and the other provides the best metric in terms of bandwidth.

Each user plane breakout function 100 may update its network condition table based on receiving updated link quality information from its neighboring user plane breakout functions.

For the sake of simplicity and ease of understanding, in this example, the processing capacity of an edge cloud 110 is indicated by a single number. It should be understood, however, that the processing capacity of an edge cloud can be composed of multiple numbers/metrics (e.g., CPU metric, memory metric, storage metric, and/or graphics processing unit (GPU) metric). Also, it is assumed in this example that the edge clouds 110 have the below processing capacity available at a given point in time when the service instance access scores are calculated. It should be noted that the processing capacity available at an edge cloud 110 can change over time depending on the number of services running on the edge cloud 110 and/or the number of UEs 130 accessing service instances running on the edge cloud 110.

| Edge Cloud ID | Capacity Metric |
| --- | --- |
| E-1 | 40 |
| E-2 | 90 |
| E-3 | 40 |
| E-4 | 100 |
| E-5 | 90 |
| E-6 | 90 |
| E-7 | 60 |
| E-8 | 70 |

This example assumes there are three different services that are hosted on the edge clouds 110. The service cost profiles of the services and the edge clouds 110 on which they are hosted are provided below. The service cost profiles are denoted in the format <Edge Capacity, Latency, Bandwidth, Min Bandwidth, Max Latency>, where Edge Capacity, Latency, and Bandwidth are weights summing up to one, and where Min Bandwidth is minimum acceptable bandwidth in Megabits perp second (Mbps) and Max Latency is maximum acceptable latency in milliseconds (ms).

| Service ID | Service Cost Profile | Hosted on Edge Cloud |
| --- | --- | --- |
| abc.com | <.2, .6, .2, 200, 10> | E-3, E-4, E-5 |
| mno.com | <.2, .2, .6, 600, 20> | E-4, E-5, E-6, E-8 |
| pqr.com | <.6, .2, .2, 300, 15> | E-5, E-8 |

An example of service instance access score calculation will now be described from the perspective of UPBF-1. Service "abc.com" is hosted on edge clouds E-3, E-4, and E-5. The capacity availability of these edge clouds is 40, 100, and 90, respectively. The link metrics of the links from UPBF-1 to UPBF-3, UPBF-4, and UPBF-5 are <5, 800>, <7, 600>, and <6, 800>, respectively. The elements of the service cost profile of service "abc.com" are as follows:

Service_Cost_Profile.Compute=0.2 [this will be called scp_compute]
  Service_Cost_Profile.Latency=0.6 [this will be called scp_latency]
  Service_Cost_Profile.Bandwidth=0.2 [this will be called scp_bandwidth]
  Service_Cost_Profile.MinBandwidth=200 [this will be called scp_minbw]
  Service_Cost_Profile.MaxLatency=10 [this will be called scp_maxlatency]

The best bandwidth is calculated as follows:
Set BestBandwidth=bw_scale_factor*scp_minbw
Thus, BestBandwidth=1.5*200=300.
The service instance access scores for the different instances of the service are calculated as follows.

| Edge ID | Capacity Score | Latency Score | Bandwidth Score | Access Score |
| --- | --- | --- | --- | --- |
|  |  | (1 - (Link_Metric.Latency/Service_Cost_Profile.MaxLatency))*100 | IF Link_Metric.Bandwidth >= BestBandwidth BandwidthScore = 100 ELSE BandwidthScore = (Link_Metric.Bandwidth/BestBandwidth)*100 | Service_Cost_Profile.Compute_Capacity*EdgeCapacityScore + Service_Cost_Profile.Bandwidth*BandwidthScore + Service_Cost_Profile.Latency*LatencyScore |
| E-3 | 40 | 50 | 100 | 58 |
| E-4 | 100 | 30 | 100 | 58 |
| E-5 | 90 | 40 | 100 | 62 |

The service instance access scores for service "mno.com" can be calculated in a similar fashion as follows.
  Service Cost Profile=<0.2, 0.2, 0.6, 600, 20>
  BestBandwidth=1.5*600=900
  Snapshot of Network condition Table from UPBF-1:

| UPBF-4 | <7,600> | <10,800> |
| UPBF-5 | <6,800> |
| UPBF-6 | <4,800> |

Service Instance Access Scores:

| Edge ID | Capacity Score | Latency Score | Bandwidth Score | Access Score |
| --- | --- | --- | --- | --- |
| E-4 | 100 | 65 | 66.7 | 73 |
| E-5 | 90 | 70 | 89 | 85 |
| E-6 | 90 | 80 | 89 | 87 |
| E-8 (via UPBF-5) | 70 | 70 | 89 | 81 |

The service instance access scores for service "pqr.com" can be calculated in a similar fashion as follows.
  Service Cost Profile=<0.6, 0.2, 0.2, 300, 15>
  BestBandwidth=1.5*300=450
  Snapshot of Network condition Table:

| UPBF-5 | <6,800> |

Service Instance Access Scores:

| Edge ID | Capacity Score | Latency Score | Bandwidth Score | Application Access Cost |
| --- | --- | --- | --- | --- |
| E-5 | 90 | 60 | 100 | 86 |
| E-8 | 70 | 60 | 100 | 74 |

Figure 13:
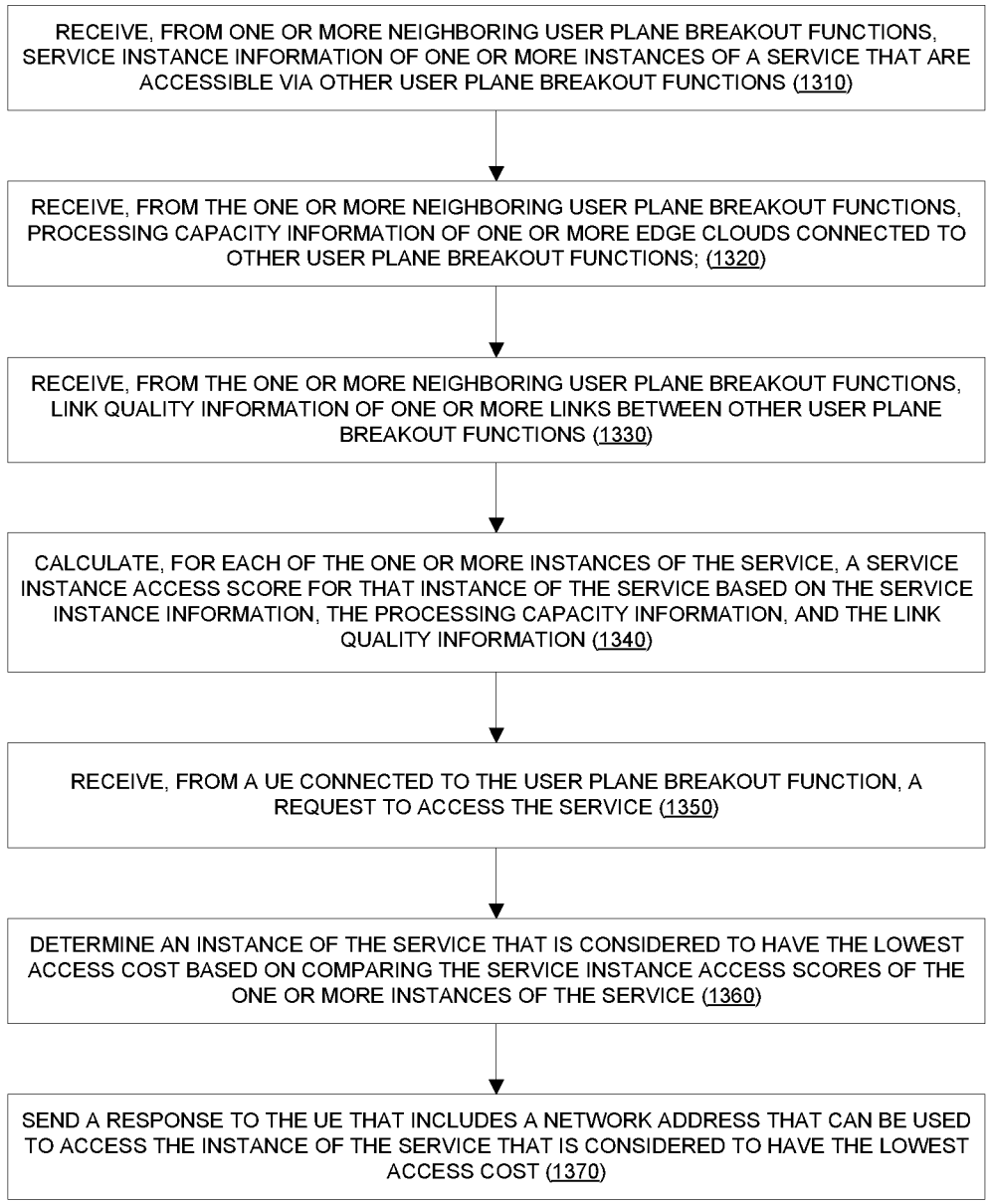
FIG. 13 is a flow diagram of a process for providing distributed local breakout, according to some embodiments.

FIG. 13 is a flow diagram of a process for providing distributed local breakout, according to some embodiments. In one embodiment, the process is implemented by a user plane breakout function in a mobile core network, where the user plane breakout function is connected to one or more neighboring user plane breakout functions in the mobile core network. In one embodiment, the mobile core network is a 5G mobile core network and each user plane breakout function 100 can be integrated in the 5G UPF or implemented as a separate entity. The process may be implemented using software, hardware, firmware, or any combination thereof.

At block 1310, the user plane breakout function receives, from one or more neighboring user plane breakout functions, service instance information of one or more instances of a service that are accessible via other user plane breakout functions.

At block 1320, the user plane breakout function receives, from the one or more neighboring user plane breakout functions, processing capacity information of one or more edge clouds connected to other user plane breakout functions.

At block 1330, the user plane breakout function receives, from the one or more neighboring user plane breakout functions, link quality information of one or more links between other user plane breakout functions.

At block 1340, the user plane breakout function calculates, for each of the one or more instances of the service, a service instance access score for that instance of the service based on the service instance information, the processing capacity information, and the link quality information. In one embodiment, the service instance access score of a particular instance of the service from the one or more instances of the service is calculated based on calculating a weighted sum of an edge cloud processing capacity score, a latency score, and a bandwidth score. In such an embodiment, the service instance information of the particular instance of the service from the one or more instances of the service may include a service cost profile of the service, where the service cost profile of the service includes weights for weighting the edge cloud processing capacity score, the latency score, and the bandwidth score. In one embodiment, the service cost profile of the service further includes an indication of a maximum latency for the service and an indication of a minimum bandwidth for the service, where the latency score is calculated based on the maximum latency of the service and the bandwidth score is calculated based on the minimum bandwidth for the service. In one embodiment, the processing capacity information of the edge cloud hosting the particular instance of the service includes one or more of: a central processing unit (CPU) availability metric indicating CPU availability at that edge cloud and a memory availability metric indicating memory availability at that edge cloud, a bandwidth availability metric indicating bandwidth availability at the edge cloud, and a network latency metric indicating network latency between the edge cloud and the user plane breakout function, where the edge cloud processing capacity score is calculated based on one or metrics included in the processing capacity information of the edge cloud hosting the particular instance of the service. In one embodiment, the latency score is calculated based on latency between the user plane breakout function and the user plane breakout function via which the particular instance of the service can be accessed and the bandwidth score is calculated based on bandwidth between the user plane breakout function and the user plane breakout function via which the particular instance of the service can be accessed.

In one embodiment, the user plane breakout function maintains a service flow forwarding table, where the service flow forwarding table includes a service identifier of the service, network addresses corresponding to different instances of the service, edge cloud identifiers of edge clouds on which the different instances of the service are hosted, user plane breakout function identifiers of user plane breakout functions via which the different instances of the service can be accessed, and service instance access scores of the different instances of the service.

At block 1350, the user plane breakout function receives, from a UE connected (e.g., via a base station) to the user plane breakout function, a request to access the service.

At block 1360, the user plane breakout function determines an instance of the service that is considered to have the lowest access cost based on comparing the service instance access scores of the one or more instances of the service.

At block 1370, the user plane breakout function sends a response to the UE that includes a network address that can be used to access the instance of the service that is considered to have the lowest access cost. In one embodiment, the request to access the service is a DNS query for a domain name corresponding to the service and the network address that can be used to access the instance of the service is an IP address that can be used to access the instance of the service.

In one embodiment, the user plane breakout function receives, from an edge cloud connected to the user plane breakout function, an indication of an instance of the service hosted by the edge cloud and an indication of processing capacity of the edge cloud. The user plane breakout function may then calculate a service instance access score for the instance of the service hosted by the edge cloud based on the indication of the instance of the service hosted by the edge cloud and the indication of processing capacity of the edge cloud, where the instance of the service that is considered to have the lowest cost is further determined based on comparing the service instance access score of the instance of the service hosted by the edge cloud with the service instance access scores of the one or more instances of the service. In one embodiment, the user plane breakout function sends, to each of the one or more neighboring user plane breakout functions, service instance information of the instance of the service hosted by the edge cloud and processing capacity information of the edge cloud.

In one embodiment, the user plane breakout function measures link qualities of one or more links between the user plane breakout function and the one or more neighboring user plane breakout functions and sends, to each of the one or more neighboring user plane breakout functions, link quality information of the one or more links between the user plane breakout function and the one or more neighboring user plane breakout functions.

Figure 14A:
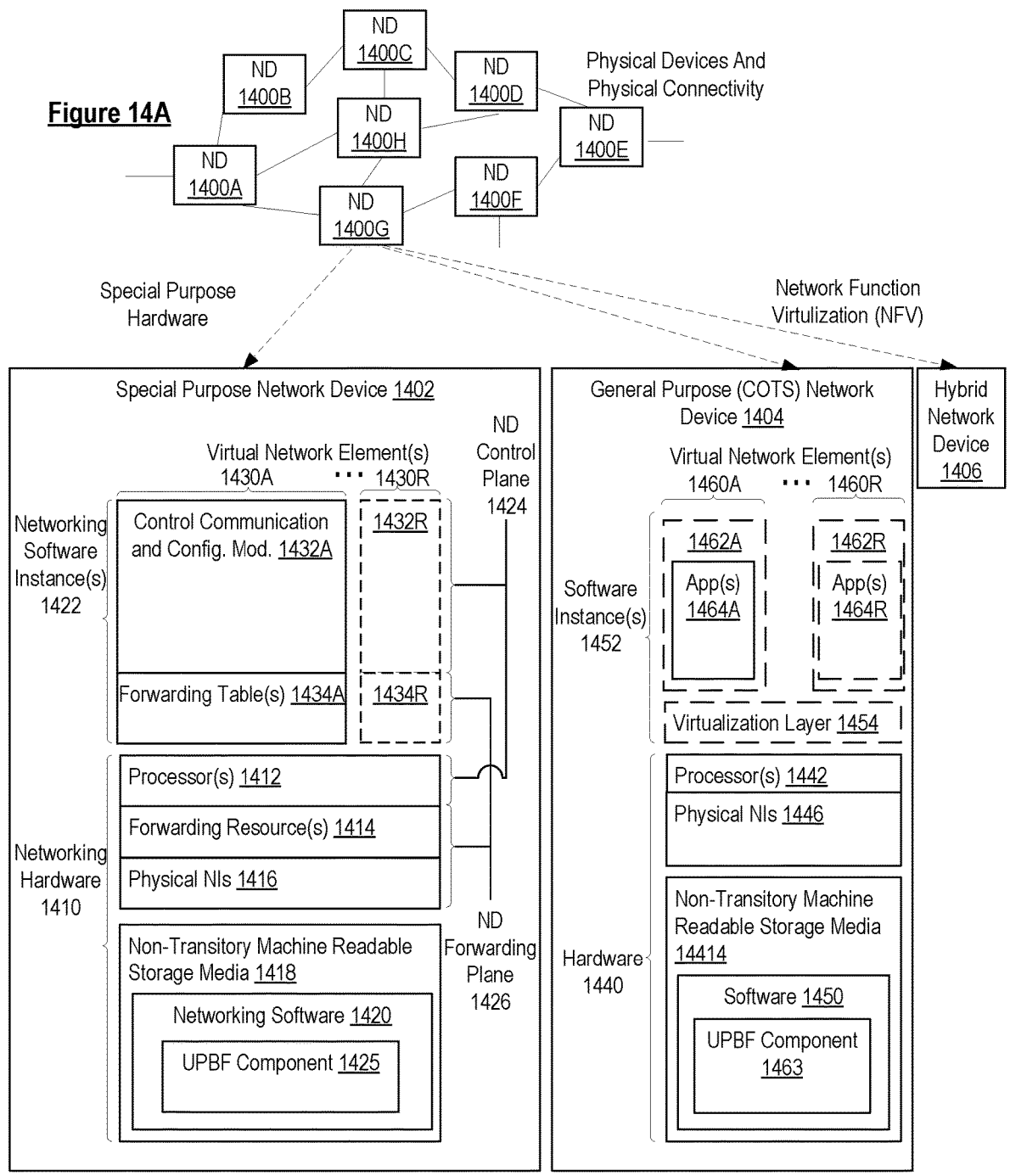
FIG. 14A illustrates connectivity between network devices NDs within an exemplary network, as well as three exemplary implementations of the NDs, according to some embodiments.

FIG. 14A illustrates connectivity between network devices (NDs) within an exemplary network, as well as three exemplary implementations of the NDs, according to some embodiments. FIG. 14A shows NDs 1400A-H, and their connectivity by way of lines between 1400A-1400B, 1400B-1400C, 1400C-1400D, 1400D-1400E, 1400E-1400F, 1400F-1400G, and 1400A-1400G, as well as between 1400H and each of 1400A, 1400C, 1400D, and 1400G. These NDs are physical devices, and the connectivity between these NDs can be wireless or wired (often referred to as a link). An additional line extending from NDs 1400A, 1400E, and 1400F illustrates that these NDs act as ingress and egress points for the network (and thus, these NDs are sometimes referred to as edge NDs; while the other NDs may be called core NDs).

Two of the exemplary ND implementations in FIG. 14A are: 1) a special-purpose network device 1402 that uses custom application-specific integrated-circuits (ASICs) and a special-purpose operating system (OS); and 2) a general purpose network device 1404 that uses common off-the-shelf (COTS) processors and a standard OS.

The special-purpose network device 1402 includes networking hardware 1410 comprising a set of one or more processor(s) 1412, forwarding resource(s) 1414 (which typically include one or more ASICs and/or network processors), and physical network interfaces (NIs) 1416 (through which network connections are made, such as those shown by the connectivity between NDs 1400A-H), as well as non-transitory machine readable storage media 1418 having stored therein networking software 1420. During operation, the networking software 1420 may be executed by the networking hardware 1410 to instantiate a set of one or more networking software instance(s) 1422. Each of the networking software instance(s) 1422, and that part of the networking hardware 1410 that executes that network software instance (be it hardware dedicated to that networking software instance and/or time slices of hardware temporally shared by that networking software instance with others of the networking software instance(s) 1422), form a separate virtual network element 1430A-R. Each of the virtual network element(s) (VNEs) 1430A-R includes a control communication and configuration module 1432A-R (sometimes referred to as a local control module or control communication module) and forwarding table(s) 1434A-R, such that a given virtual network element (e.g., 1430A) includes the control communication and configuration module (e.g., 1432A), a set of one or more forwarding table(s) (e.g., 1434A), and that portion of the networking hardware 1410 that executes the virtual network element (e.g., 1430A).

Software 1420 can include code such as user plane breakout function (UPBF) component 1425, which when executed by networking hardware 1410, causes the special-purpose network device 1402 to perform operations of one or more embodiments described herein above as part networking software instances 1422 (e.g., to provide dynamic distributed local breakout).

The special-purpose network device 1402 is often physically and/or logically considered to include: 1) a ND control plane 1424 (sometimes referred to as a control plane) comprising the processor(s) 1412 that execute the control communication and configuration module(s) 1432A-R; and 2) a ND forwarding plane 1426 (sometimes referred to as a forwarding plane, a data plane, or a media plane) comprising the forwarding resource(s) 1414 that utilize the forwarding table(s) 1434A-R and the physical NIs 1416. By way of example, where the ND is a router (or is implementing routing functionality), the ND control plane 1424 (the processor(s) 1412 executing the control communication and configuration module(s) 1432A-R) is typically responsible for participating in controlling how data (e.g., packets) is to be routed (e.g., the next hop for the data and the outgoing physical NI for that data) and storing that routing information in the forwarding table(s) 1434A-R, and the ND forwarding plane 1426 is responsible for receiving that data on the physical NIs 1416 and forwarding that data out the appropriate ones of the physical NIs 1416 based on the forwarding table(s) 1434A-R.

Figure 14B:
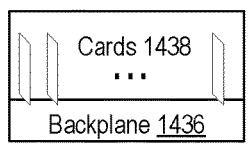
FIG. 14B illustrates an exemplary way to implement the special-purpose network device, according to some embodiments.

FIG. 14B illustrates an exemplary way to implement the special-purpose network device 1402, according to some embodiments. FIG. 14B shows a special-purpose network device including cards 1438 (typically hot pluggable). While in some embodiments the cards 1438 are of two types (one or more that operate as the ND forwarding plane 1426 (sometimes called line cards), and one or more that operate to implement the ND control plane 1424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1436 (e.g., a first full mesh coupling the line cards and a second full mesh coupling all of the cards).

Returning to FIG. 14A, the general purpose network device 1404 includes hardware 1440 comprising a set of one or more processor(s) 1442 (which are often COTS processors) and physical NIs 1446, as well as non-transitory machine readable storage media 1448 having stored therein software 1450. During operation, the processor(s) 1442 execute the software 1450 to instantiate one or more sets of one or more applications 1464A-R. While one embodiment does not implement virtualization, alternative embodiments may use different forms of virtualization. For example, in one such alternative embodiment the virtualization layer 1454 represents the kernel of an operating system (or a shim executing on a base operating system) that allows for the creation of multiple instances 1462A-R called software containers that may each be used to execute one (or more) of the sets of applications 1464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1454 represents a hypervisor (sometimes referred to as a virtual machine monitor (VMM)) or a hypervisor executing on top of a host operating system, and each of the sets of applications 1464A-R is run on top of a guest operating system within an instance 1462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g, from a library operating system (LibOS) including drivers/libraries of OS services) that provide the particular OS services needed by the application. As a unikernel can be implemented to run directly on hardware 1440, directly on a hypervisor (in which case the unikernel is sometimes described as running within a LibOS virtual machine), or in a software container, embodiments can be implemented fully with unikernels running directly on a hypervisor represented by virtualization layer 1454, unikernels running within software containers represented by instances 1462A-R, or as a combination of unikernels and the above-described techniques (e.g., unikernels and virtual machines both run directly on a hypervisor, unikernels and sets of applications that are run in different software containers).

The instantiation of the one or more sets of one or more applications 1464A-R, as well as virtualization if implemented, are collectively referred to as software instance(s) 1452. Each set of applications 1464A-R, corresponding virtualization construct (e.g., instance 1462A-R) if implemented, and that part of the hardware 1440 that executes them (be it hardware dedicated to that execution and/or time slices of hardware temporally shared), forms a separate virtual network element(s) 1460A-R.

The virtual network element(s) 1460A-R perform similar functionality to the virtual network element(s) 1430A-R—e.g., similar to the control communication and configuration module(s) 1432A and forwarding table(s) 1434A (this virtualization of the hardware 1440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1462A-R corresponding to one VNE 1460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1462A-R to VNEs also apply to embodiments where such a finer level of granularity and/or unikernels are used.

In certain embodiments, the virtualization layer 1454 includes a virtual switch that provides similar forwarding services as a physical Ethernet switch. Specifically, this virtual switch forwards traffic between instances 1462A-R and the physical NI(s) 1446, as well as optionally between the instances 1462A-R; in addition, this virtual switch may enforce network isolation between the VNEs 1460A-R that by policy are not permitted to communicate with each other (e.g., by honoring virtual local area networks (VLANs)).

Software 1450 can include code such as user plane breakout function (UPBF) component 1463, which when executed by processor(s) 1442, cause the general purpose network device 1404 to perform operations of one or more embodiments described herein above as part software instances 1462A-R (e.g., to provide dynamic distributed local breakout).

The third exemplary ND implementation in FIG. 14A is a hybrid network device 1406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1402) could provide for para-virtualization to the networking hardware present in the hybrid network device 1406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1430A-R, VNEs 1460A-R, and those in the hybrid network device 1406) receives data on the physical NIs (e.g., 1416, 1446) and forwards that data out the appropriate ones of the physical NIs (e.g., 1416, 1446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a user plane breakout function in a mobile core network for providing dynamic distributed local breakout, wherein the user plane breakout function is connected to one or more neighboring user plane breakout functions in the mobile core network, the method comprising:
   receiving, from the one or more neighboring user plane breakout functions, service instance information of one or more instances of a service that are accessible via other user plane breakout functions;
   receiving, from the one or more neighboring user plane breakout functions, processing capacity information of one or more edge clouds connected to other user plane breakout functions;
   receiving, from the one or more neighboring user plane breakout functions, link quality information of one or more links between other user plane breakout functions;
   calculating, for each of the one or more instances of the service, a service instance access score for that instance of the service based on the service instance information, the processing capacity information, and the link quality information;
   maintaining a service flow forwarding table that includes information regarding the one or more instances of the service including network addresses that can be used to access the one or more instances of the service and the service instance access scores of the one or more instances of the service;
   receiving, from a user equipment (UE) connected to the user plane breakout function, a request to access the service;
   determining an instance of the service that is considered to have the lowest access cost based on performing a look up for the service in the service flow forwarding table to obtain the service instance access scores of the one or more instances of the service and comparing the service instance access scores of the one or more instances of the service; and
   sending a response to the UE that includes a network address that can be used to access the instance of the service that is considered to have the lowest access cost.

2. The method of claim 1, further comprising:
   receiving, from an edge cloud connected to the user plane breakout function, an indication of an instance of the service hosted by the edge cloud and an indication of processing capacity of the edge cloud;
   calculating a service instance access score for the instance of the service hosted by the edge cloud based on the indication of the instance of the service hosted by the edge cloud and the indication of the processing capacity of the edge cloud; and
   storing information regarding the instance of the service hosted by the edge cloud, including the service instance access score of the service hosted by the edge cloud, in the service flow forwarding table.

3. The method of claim 2, further comprising:
   sending, to each of the one or more neighboring user plane breakout functions, service instance information of the instance of the service hosted by the edge cloud and processing capacity information of the edge cloud.

4. The method of claim 1, further comprising:
   measuring link qualities of one or more links between the user plane breakout function and the one or more neighboring user plane breakout functions; and
   sending, to each of the one or more neighboring user plane breakout functions, link quality information of the one or more links between the user plane breakout function and the one or more neighboring user plane breakout functions.

5. The method of claim 1, wherein the service instance access score of a particular instance of the service from the one or more instances of the service is calculated based on calculating a weighted sum of an edge cloud processing capacity score, a latency score, and a bandwidth score.

6. The method of claim 5, wherein the service instance information of the particular instance of the service from the one or more instances of the service includes a service cost profile of the service, wherein the service cost profile of the service includes weights for weighting the edge cloud processing capacity score, the latency score, and the bandwidth score.

7. The method of claim 6, wherein the service cost profile of the service further includes an indication of a maximum latency for the service and an indication of a minimum bandwidth for the service, wherein the latency score is calculated based on the maximum latency of the service and the bandwidth score is calculated based on the minimum bandwidth for the service.

8. The method of claim 5, wherein the processing capacity information of the edge cloud hosting the particular instance of the service includes one or more of: a central processing unit (CPU) availability metric indicating CPU availability at that edge cloud and a memory availability metric indicating memory availability at that edge cloud, a bandwidth availability metric indicating bandwidth availability at the edge cloud, and a network latency metric indicating network latency between the edge cloud and the user plane breakout function, wherein the edge cloud processing capacity score is calculated based on one or metrics included in the processing capacity information of the edge cloud hosting the particular instance of the service.

9. The method of claim 5, wherein the latency score is calculated based on latency between the user plane breakout function and the user plane breakout function via which the particular instance of the service can be accessed, wherein the bandwidth score is calculated based on bandwidth between the user plane breakout function and the user plane breakout function via which the particular instance of the service can be accessed.

10. The method of claim 1, wherein the request to access the service is a domain name service (DNS) query for a domain name corresponding to the service, wherein the network address that can be used to access the instance of the service is an Internet Protocol (IP) address that can be used to access the instance of the service.

11. The method of claim 1, further comprising:
wherein the information regarding the one or more instances of the service included in the service flow forwarding table further includes a service identifier of the service, edge cloud identifiers of edge clouds on which the one or more instances of the service are hosted, and user plane breakout function identifiers of user plane breakout functions via which the one or more instances of the service can be accessed.

12. The method of claim 1, wherein the mobile core network is a 5th Generation (5G) mobile core network.

13. A network device configured to implement a user plane breakout function in a mobile core network that provides dynamic distributed local breakout, wherein the user plane breakout function is connected to one or more neighboring user plane breakout functions in the mobile core network, the network device comprising:
one or more processors; and
a non-transitory machine-readable storage medium having instructions stored therein, which when executed by the one or more processors, causes the user plane breakout function to:
receive, from the one or more neighboring user plane breakout functions, service instance information of one or more instances of a service that are accessible via other user plane breakout functions,
receive, from the one or more neighboring user plane breakout functions, processing capacity information of one or more edge clouds connected to other user plane breakout functions,
receive, from the one or more neighboring user plane breakout functions, link quality information of one or more links between other user plane breakout functions,
calculate, for each of the one or more instances of the service, a service instance access score for that instance of the service based on the service instance information, the processing capacity information, and the link quality information,
maintain a service flow forwarding table that includes information regarding the one or more instances of the service including network addresses that can be used to access the one or more instances of the service and the service instance access scores of the one or more instances of the service;
receive, from a user equipment (UE) connected to the user plane breakout function, a request to access the service,
determine an instance of the service that is considered to have the lowest access cost based on performing a look up for the service in the service flow forwarding table to obtain the service instance access scores of the one or more instances of the service and comparing the service instance access scores of the one or more instances of the service, and
send a response to the UE that includes a network address that can be used to access the instance of the service that is considered to have the lowest access cost.

14. The network device of claim 13, wherein the service instance access score of a particular instance of the service from the one or more instances of the service is calculated based on calculating a weighted sum of an edge cloud processing capacity score, a latency score, and a bandwidth score.

15. The network device of claim 14, wherein the service instance information of the particular instance of the service from the one or more instances of the service includes a service cost profile of the service, wherein the service cost profile of the service includes weights for weighting the edge cloud processing capacity score, the latency score, and the bandwidth score.

16. The network device of claim 15, wherein the service cost profile of the service further includes an indication of a maximum latency for the service and an indication of a minimum bandwidth for the service, wherein the latency score is calculated based on the maximum latency of the service and the bandwidth score is calculated based on the minimum bandwidth for the service.

17. A set of one or more non-transitory machine-readable storage media storing instructions which, when executed by one or more processors of a network device implementing a user plane breakout function in a mobile core network, causes the user plane breakout function to perform operations for providing dynamic distributed local breakout, wherein the user plane breakout function is connected to one or more neighboring user plane breakout functions in the mobile core network, the operations comprising:
receiving, from the one or more neighboring user plane breakout functions, service instance information of one or more instances of a service that are accessible via other user plane breakout functions;
receiving, from the one or more neighboring user plane breakout functions, processing capacity information of one or more edge clouds connected to other user plane breakout functions;
receiving, from the one or more neighboring user plane breakout functions, link quality information of one or more links between other user plane breakout functions;
calculating, for each of the one or more instances of the service, a service instance access score for that instance of the service based on the service instance information, the processing capacity information, and the link quality information;
maintaining a service flow forwarding table that includes information regarding the one or more instances of the service including network addresses that can be used to access the one or more instances of the service and the service instance access scores of the one or more instances of the service;

receiving, from a user equipment (UE) connected to the user plane breakout function, a request to access the service;

determining an instance of the service that is considered to have the lowest access cost based on performing a look up for the service in the service flow forwarding table to obtain the service instance access scores of the one or more instances of the service and comparing the service instance access scores of the one or more instances of the service; and sending a response to the UE that includes a network address that can be used to access the instance of the service that is considered to have the lowest access cost.

18. The set of one or more non-transitory machine-readable storage media of claim 17, wherein the operations further comprise:

receiving, from an edge cloud connected to the user plane breakout function, an indication of an instance of the service hosted by the edge cloud and an indication of processing capacity of the edge cloud;

calculating a service instance access score for the instance of the service hosted by the edge cloud based on the indication of the instance of the service hosted by the edge cloud and the indication of the processing capacity of the edge cloud;

storing information regarding the instance of the service hosted by the edge cloud, including the service instance access score of the service hosted by the edge cloud, in the service flow forwarding table.

19. The set of one or more non-transitory machine-readable storage media of claim 18, wherein the operations further comprise:

sending, to each of the one or more neighboring user plane breakout functions, service instance information of the instance of the service hosted by the edge cloud and processing capacity information of the edge cloud.

20. The set of one or more non-transitory machine-readable storage media of claim 17, wherein the service instance access score of a particular instance of the service from the one or more instances of the service is calculated based on calculating a weighted sum of an edge cloud processing capacity score, a latency score, and a bandwidth score.

* * * * *